US011539400B2

(12) United States Patent
Tsukamoto

(10) Patent No.: US 11,539,400 B2
(45) Date of Patent: Dec. 27, 2022

(54) POWER SUPPLY APPARATUS AND ELECTRONIC APPARATUS CONFIGURED TO CARRY OUT WIRELESS POWER SUPPLY

(71) Applicant: CANON KABUSHIKI KAISHA, Tokyo (JP)

(72) Inventor: Nobuyuki Tsukamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 168 days.

(21) Appl. No.: 16/505,533

(22) Filed: Jul. 8, 2019

(65) Prior Publication Data

US 2019/0334583 A1 Oct. 31, 2019

Related U.S. Application Data

(63) Continuation of application No. 14/858,849, filed on Sep. 18, 2015, now Pat. No. 10,374,660.

(30) Foreign Application Priority Data

Sep. 22, 2014 (JP) ................. 2014-192879

(51) Int. Cl.
*H04B 5/00* (2006.01)
*H02J 50/10* (2016.01)
*H02J 7/00* (2006.01)

(52) U.S. Cl.
CPC ............ *H04B 5/0037* (2013.01); *H02J 7/007* (2013.01); *H02J 50/10* (2016.02)

(58) Field of Classification Search
CPC ........ H04B 5/0037; H02J 50/10; H02J 5/005; H02J 7/025; H02J 7/042
See application file for complete search history.

(56) References Cited

U.S. PATENT DOCUMENTS

| | | | | |
|---|---|---|---|---|
| 2003/0015993 | A1* | 1/2003 | Misra ................ | H02J 7/0071 320/125 |
| 2007/0021140 | A1* | 1/2007 | Keyes ................ | H02J 50/12 455/522 |
| 2011/0244794 | A1* | 10/2011 | Nakano .............. | H02J 50/80 455/41.1 |
| 2011/0264297 | A1* | 10/2011 | Nakano .............. | H02J 50/12 700/297 |
| 2012/0001591 | A1* | 1/2012 | Fukaya .............. | H02J 50/90 320/108 |
| 2012/0040613 | A1* | 2/2012 | Nakano .............. | H02J 5/005 455/41.1 |
| 2012/0256495 | A1* | 10/2012 | Fukaya .............. | H02J 50/10 307/104 |
| 2013/0154557 | A1* | 6/2013 | Lee .................. | H02J 50/12 320/108 |

(Continued)

*Primary Examiner* — Daniel Kessie
*Assistant Examiner* — Brian K Baxter
(74) *Attorney, Agent, or Firm* — Canon U.S.A. Inc. IP Division

(57) ABSTRACT

A power supply apparatus includes a power supply unit configured to wirelessly supply power to an electronic apparatus, a communication unit configured to transmit, to the electronic apparatus, information indicating whether to perform a foreign object detection process for detecting a foreign object, and a control unit configured to cause the communication unit to transmit the information to the electronic apparatus before outputting of predetermined power to the electronic apparatus.

11 Claims, 12 Drawing Sheets

(56) References Cited

U.S. PATENT DOCUMENTS

| | | | | |
|---|---|---|---|---|
| 2013/0211606 A1* | 8/2013 | Takemura | G05B 11/01 | 700/286 |
| 2013/0211607 A1* | 8/2013 | Takemura | H04B 3/54 | 700/286 |
| 2013/0241293 A1* | 9/2013 | Yamaguchi | G03G 15/5004 | 307/66 |
| 2013/0264888 A1* | 10/2013 | Sako | H04B 5/0037 | 307/104 |
| 2013/0285618 A1* | 10/2013 | Iijima | H02J 5/005 | 320/137 |
| 2013/0342160 A1* | 12/2013 | Tanabe | H04B 5/0075 | 320/108 |
| 2014/0084701 A1* | 3/2014 | Bae | H02J 5/005 | 307/104 |
| 2014/0208131 A1* | 7/2014 | Kano | H02J 50/40 | 713/300 |
| 2014/0239735 A1* | 8/2014 | Abe | B60L 50/16 | 307/104 |
| 2014/0292094 A1* | 10/2014 | Tsukamoto | H02J 50/10 | 307/104 |
| 2014/0292095 A1* | 10/2014 | Tsukamoto | H02J 50/12 | 307/104 |
| 2014/0327319 A1* | 11/2014 | Byun | H04B 5/0075 | 307/104 |
| 2014/0327409 A1* | 11/2014 | Lee | H02J 50/60 | 320/137 |
| 2014/0365807 A1* | 12/2014 | Nakano | G06F 1/26 | 713/340 |
| 2015/0061398 A1* | 3/2015 | Kudo | H04B 5/0031 | 307/104 |
| 2015/0372493 A1* | 12/2015 | Sankar | H02J 7/00308 | 307/104 |
| 2016/0031332 A1* | 2/2016 | Garcia Briz | H02J 7/007 | 320/108 |
| 2016/0087455 A1* | 3/2016 | Tanabe | H02J 5/005 | 307/104 |
| 2016/0126752 A1* | 5/2016 | Vuori | H02J 50/80 | 307/104 |
| 2016/0164302 A1* | 6/2016 | Nakano | H02J 50/60 | 307/104 |
| 2017/0018977 A1* | 1/2017 | Van Wageningen | H02J 50/12 | |
| 2017/0033606 A1* | 2/2017 | Maikawa | H02J 50/70 | |
| 2017/0093222 A1* | 3/2017 | Joye | H04B 5/0087 | |
| 2017/0163100 A1* | 6/2017 | Vocke | H02J 50/12 | |

* cited by examiner

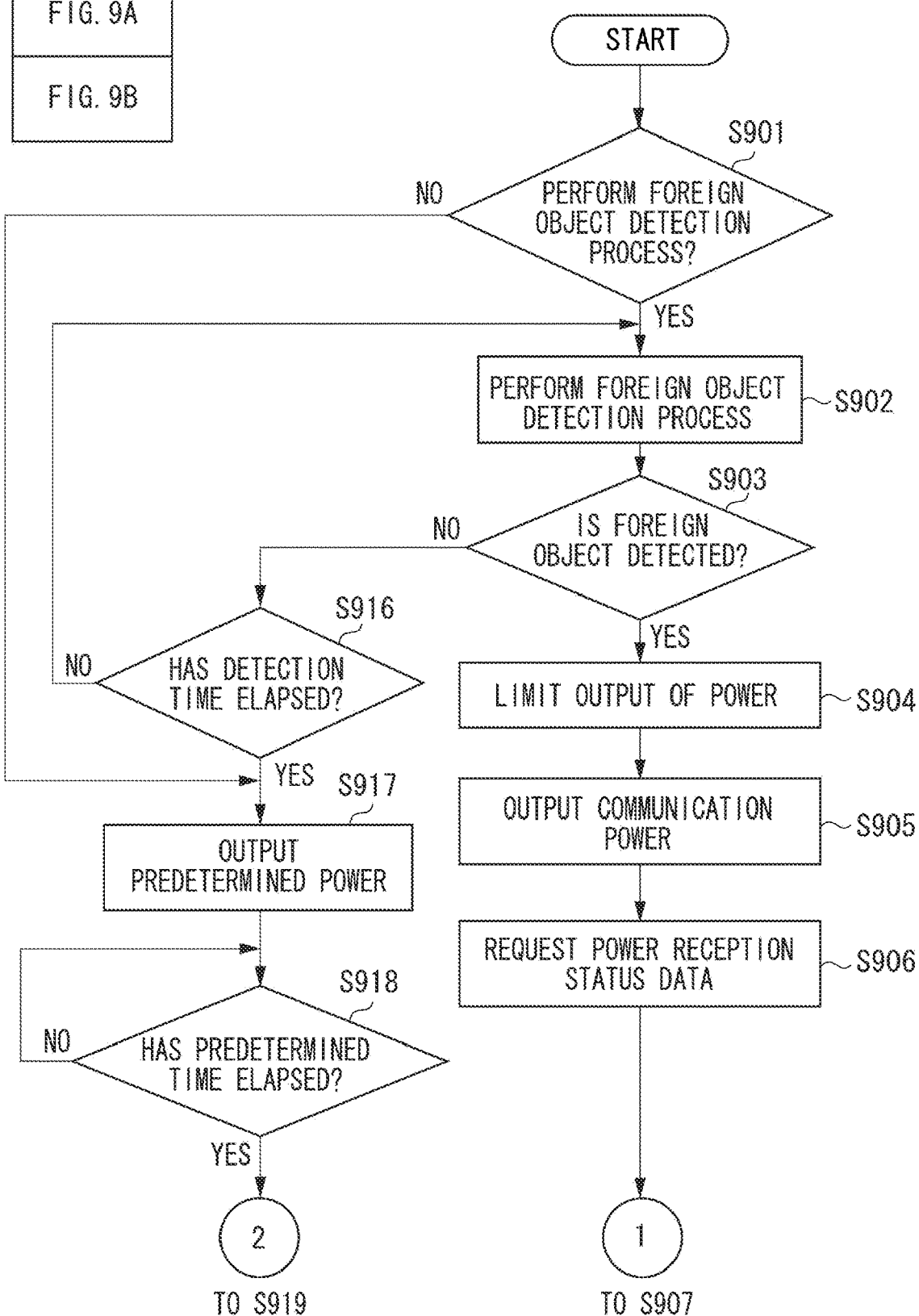

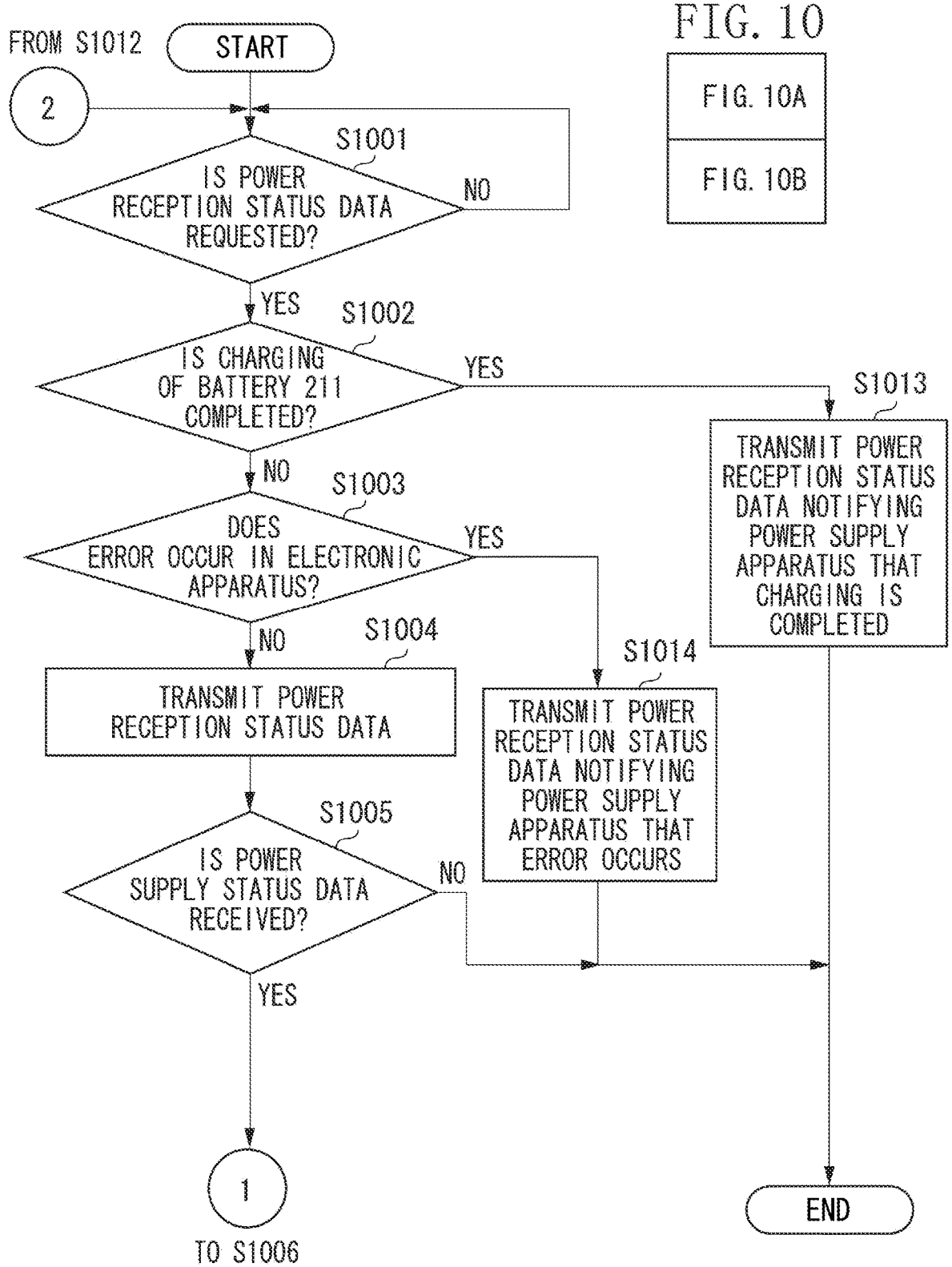

POWER SUPPLY APPARATUS AND ELECTRONIC APPARATUS CONFIGURED TO CARRY OUT WIRELESS POWER SUPPLY

CROSS REFERENCE TO RELATED APPLICATIONS

The present application is a continuation of U.S. patent application Ser. No. 14/858,849, filed on Sep. 18, 2015, which claims priority from Japanese Patent Application No. 2014-192879 filed Sep. 22, 2014, which is hereby incorporated by reference herein in its entirety.

BACKGROUND OF THE INVENTION

Field of the Invention

The present invention relates to a power supply apparatus and an electronic apparatus configured to carry out wireless power supply.

Description of the Related Art

In recent years, there has been known a power supply system including a power supply apparatus provided with a primary coil for wirelessly outputting power without being connected via a connector, and an electronic apparatus provided with a secondary coil for wirelessly receiving the power supplied from the power supply apparatus.

In such a power supply system, there has been known that the electronic apparatus charges a battery with use of the power received from the power supply apparatus via the secondary coil as discussed in Japanese Patent Application Laid-Open No. 2001-275266.

SUMMARY OF THE INVENTION

According to an aspect of the present invention, a power supply apparatus includes a power supply unit configured to wirelessly supply power to an electronic apparatus, a communication unit configured to transmit information indicating whether to perform a foreign object detection process for detecting a foreign object to the electronic apparatus, and a control unit configured to cause the communication unit to transmit the information to the electronic apparatus before outputting predetermined power to the electronic apparatus.

According to another aspect of the present invention, an electronic apparatus includes a power reception unit configured to wirelessly receive power from a power supply apparatus, a communication unit configured to receive, from the power supply apparatus, information indicating whether to perform a foreign object detection process for detecting a foreign object, and a control unit configured to limit a load of the electronic apparatus until a detection time, during which the power supply apparatus performs the foreign object detection process, has elapsed, after the communication unit receives, from the power supply apparatus, information indicating to perform the foreign object detection process.

According to yet another aspect of the present invention, an electronic apparatus includes a power reception unit configured to wirelessly receive power from a power supply apparatus, a communication unit configured to receive, from the power supply apparatus, information indicating whether to perform a foreign object detection process for detecting a foreign object, and a control unit configured to limit power consumed by the electronic apparatus until a detection time, during which the power supply apparatus performs the foreign object detection process, has elapsed, after the communication unit receives, from the power supply apparatus, information indicating to perform the foreign object detection process.

According to yet another aspect of the present invention, an electronic apparatus includes a power reception unit configured to wirelessly receive power from a power supply apparatus, a communication unit configured to receive, from the power supply apparatus, information indicating whether to perform a foreign object detection process for detecting a foreign object from the power supply apparatus, and a control unit configured to limit an electric current flowing in the electronic apparatus until a detection time, during which the power supply apparatus performs the foreign object detection process, has elapsed, after the communication unit receives information indicating to perform the foreign object detection process from the power supply apparatus.

According to yet another aspect of the present invention, a method for controlling a power supply apparatus includes supplying power wirelessly to an electronic apparatus, transmitting, to the electronic apparatus, information indicating whether to perform a foreign object detection process for detecting a foreign object, and performing control so as to cause information indicating whether to perform a foreign object detection process for detecting a foreign object to be transmitted to the electronic apparatus in the communicating before outputting of predetermined power to the electronic apparatus.

According to yet another aspect of the present invention, a method for controlling an electronic apparatus includes receiving power wirelessly from a power supply apparatus, performing communication so as to receive information indicating whether to perform a foreign object detection process for detecting a foreign object from the power supply apparatus, and performing control so as to limit a load of the electronic apparatus until a detection time, during which the power supply apparatus performs the foreign object detection process, has elapsed, after information indicating to perform the foreign object detection process is received from the power supply apparatus.

According to yet another aspect of the present invention, a method for controlling an electronic apparatus includes receiving power wirelessly from a power supply apparatus, performing communication so as to receive information indicating whether to perform a foreign object detection process for detecting a foreign object, and performing control so as to limit an electric current flowing in the electronic apparatus until a detection time, during which the power supply apparatus performs the foreign object detection process, has elapsed, after information indicating to perform the foreign object detection process is received from the power supply apparatus.

Further features of the present invention will become apparent from the following description of exemplary embodiments with reference to the attached drawings.

DESCRIPTION OF THE EMBODIMENTS

In the following description, a first exemplary embodiment of the present invention will be described with reference to the drawings.

Figure 1:
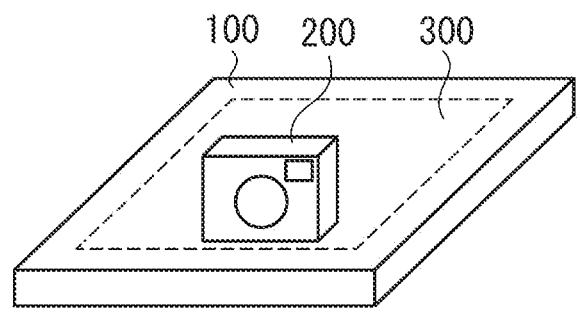
FIG. 1 illustrates an example of a wireless power supply system according to a first exemplary embodiment.

As illustrated in FIG. 1, a wireless power supply system according to the first exemplary embodiment includes a power supply apparatus 100 and an electronic apparatus 200. In the wireless power supply system according to the first exemplary embodiment, the power supply apparatus 100 wirelessly supplies power to the electronic apparatus 200, if the electronic apparatus 200 is located within a predetermined range 300 with respect to the power supply apparatus 100. Further, the electronic apparatus 200 can wirelessly receive the power output from the power supply apparatus 100, if located within the predetermined range 300. On the other hand, the electronic apparatus 200 cannot receive the power from the power supply apparatus 100, if not located within the predetermined range 300. The predetermined range 300 is defined to be a range that allows the power supply apparatus 100 to communicate with the electronic apparatus 200. The predetermined range 300 is defined to be a range above a housing of the power supply apparatus 100, but is not limited thereto. Further, the power supply apparatus 100 may wirelessly supply power to a plurality of electronic apparatuses.

The electronic apparatus 200 may be an imaging apparatus or a reproduction apparatus, or may be a communication apparatus, such as a mobile phone and a smartphone. Alternatively, the electronic apparatus 200 may be a battery pack including a battery. Alternatively, the electronic apparatus 200 may be an automobile or a display, or may be a personal computer.

Figure 2:
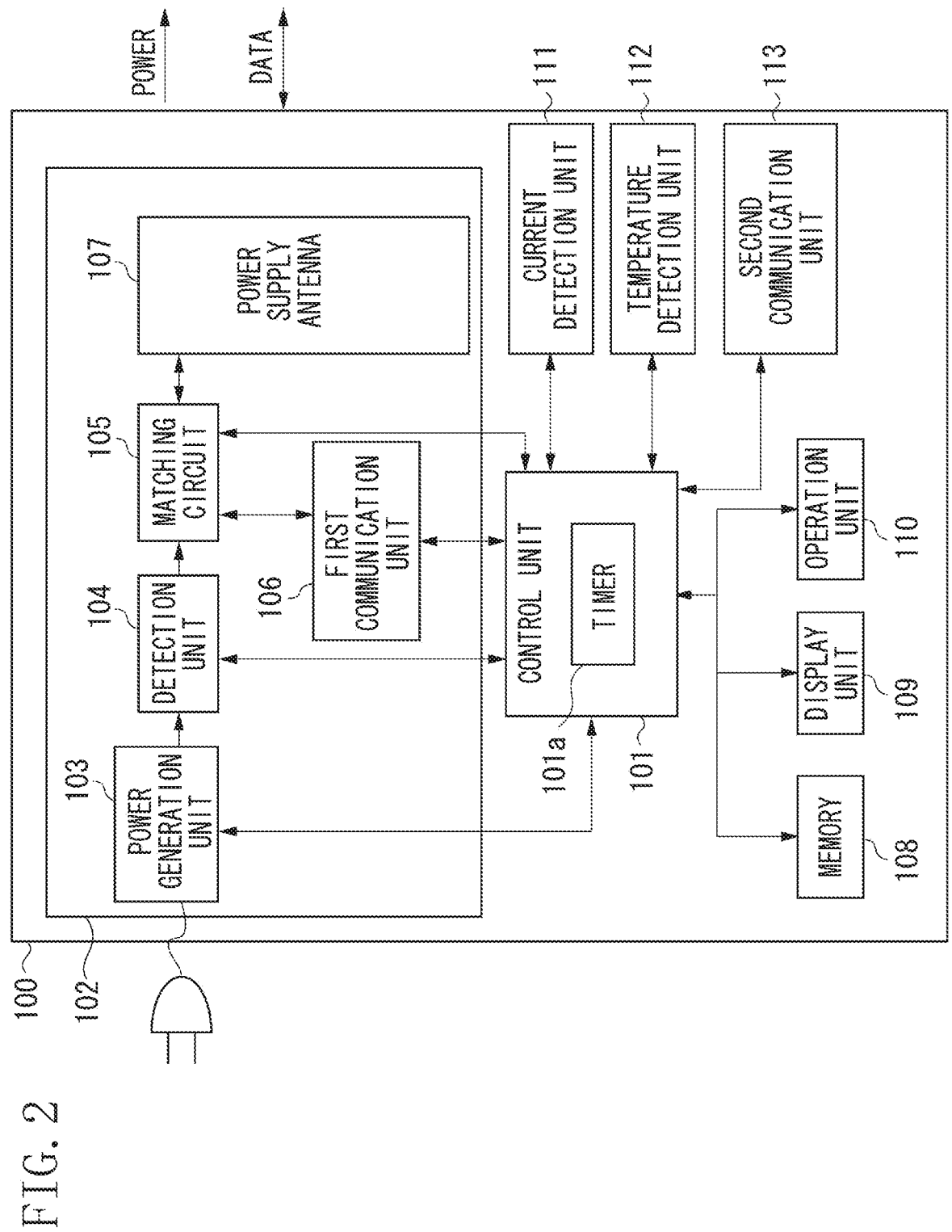
FIG. 2 is a block diagram illustrating an example of a power supply apparatus according to the first exemplary embodiment.

Next, an example of a configuration of the power supply apparatus 100 according to the first exemplary embodiment will be described with reference to FIG. 2. As illustrated in FIG. 2, the power supply apparatus 100 includes a control unit 101, a power supply unit 102, a memory 108, a display unit 109, an operation unit 110, a current detection unit 111, a temperature detection unit 112, and a second communication unit 113. The power supply unit 102 includes a power generation unit 103, a detection unit 104, a matching circuit 105, a first communication unit 106, and a power supply antenna 107.

The control unit 101 controls the power supply apparatus 100 by executing a computer program recorded in the memory 108. The control unit 101 includes, for example, a central processing unit (CPU) or a micro processing unit (MPU). Assume that the control unit 101 is constituted by hardware. Further, the control unit 101 includes a timer 101a.

The power supply unit 102 is used to wirelessly supply power based on a predetermined power supply method. The predetermined power supply method is, for example, a power supply method using the magnetic resonance method. The magnetic resonance method is a method that transmits power from the power supply apparatus 100 to the electronic apparatus 200 in a state in which resonance is achieved between the power supply apparatus 100 and the electronic apparatus 200. The state in which resonance is achieved between the power supply apparatus 100 and the electronic apparatus 200 is a state in which a resonance frequency of the power supply antenna 107 of the power supply apparatus 100 and a resonance frequency of a power reception antenna 203 of the electronic apparatus 200 match a frequency of the power to be supplied. The predetermined power supply method may be a power supply method using a method other than the magnetic resonance method.

When an alternating-current (AC) power source (not illustrated) and the power supply apparatus 100 are connected to each other, the power generation unit 103 generates power to be output to the outside via the power supply antennal 107 with use of power supplied from the AC power source (not illustrated).

The power generated by the power generation unit 103 includes communication power and predetermined power. The communication power is used for the first communication unit 106 to communicate with the electronic apparatus 200. Assume that the communication power is, for example, slight power of 1 W or lower. The communication power may be power specified in a communication standard of the first communication unit 106. The predetermined power is used by the electronic apparatus 200 for performing charging a battery and a specific operation. Assume that the predetermined power is, for example, power of 2 W or higher. However, the predetermined power is not limited to the power of 2 W or higher as long as the predetermined power is higher power than the communication power. A value of the predetermined power is set by the control unit 101 based on data acquired from the electronic apparatus 200.

The power generated by the power generation unit 103 is supplied to the power supply antenna 7 via the detection unit 104 and the matching circuit 105.

The detection unit 104 detects a voltage standing wave ratio (VSWR) to detect a resonance state between the power supply apparatus 100 and the electronic apparatus 200. Further, the detection unit 104 provides data indicating the detected VSWR to the control unit 101. The VSWR is a value indicating a relationship between a traveling wave of the power output from the power supply antenna 107 and a reflection wave of the power output from the power supply antenna 107. The control unit 101 can detect a change in the resonance state between the power supply apparatus 100 and the electronic apparatus 200, and presence of a foreign object with use of the data indicating the VSWR that is provided from the detection unit 104. The foreign object is, for example, a metal, an integrated circuit (IC) card. The foreign object may be an apparatus that does not support the power supply method employed by the power supply apparatus 100, an apparatus that does not include a charging unit for charging a battery, or an apparatus that does not include a communication unit for communicating with the power supply apparatus 100. Further, the foreign object may be an apparatus that does not support the communication standard of the first communication unit 106. The control unit 101 detects the foreign object, if the VSWR detected by the detection unit 104 changes by a predetermined value or larger.

The matching circuit 105 includes a circuit for setting the resonance frequency of the power supply antenna 107, and a circuit for achieving impedance matching between the power generation unit 103 and the power supply antennal 107.

When the power supply apparatus 100 outputs any one of the communication power and the predetermined power via the power supply antenna 107, the control unit 101 controls the matching circuit 105 so as to set the resonance frequency of the power supply antenna 107 to a predetermined frequency f. The predetermined frequency f is, for example, 13.56 MHz. Alternatively, the predetermined frequency f may be 6.78 MHz, or may be a frequency specified in the communication standard of the first communication unit 106.

The first communication unit 106 performs wireless communication based on, for example, the Near Filed Communication (NFC) standard defined by the NFC forum. Alternatively, the communication standard of the first communication unit 106 may be the International Organization for Standardization (ISO)/International Electrotechnical Commission (IEC) 18092 standard, may be the ISO/IEC 14443 standard, or may be the ISO/IEC 21481 standard. While the communication power is output from the power supply antenna 107, the first communication unit 106 can transmit and receive data for carrying out the wireless power supply with the electronic apparatus 200 via the power supply antenna 107. However, assume that the first communication unit 106 does not communicate with the electronic apparatus 200 via the power supply antenna 107 while the predetermined power is output from the power supply antenna 107. Hereinafter, a time period during which the predetermined power is output from the power supply antenna 107 will be referred to as a "predetermined time". The predetermined time is set by the control unit 101 based on the data acquired from the electronic apparatus 200.

The data transmitted and received between the first communication unit 106 and the electronic apparatus 200 is data in compliance with NFCData Exchange Format (NDEF).

When transmitting the data in compliance with NDEF to the electronic apparatus 200, the first communication unit 106 performs a process for superposing the data onto the communication power supplied from the power generation unit 103. The communication power with the data superposed thereon is transmitted to the electronic apparatus 200 via the power supply antenna 107.

When receiving the data in compliance with NDEF from the electronic apparatus 200, the first communication unit 106 detects a current flowing in the power supply antenna 107, and receives the data from the electronic apparatus 200 according to a result of the detection of this current. This is because the electronic apparatus 200 transmits the data by changing a load inside the electronic apparatus 200 when transmitting the data in compliance with NDEF to the power supply apparatus 100. The change in the load inside the electronic apparatus 200 causes a change in the current flowing in the power supply antenna 107, whereby the first communication unit 106 can receive the data in compliance with NDEF from the electronic apparatus 200 by detecting the current flowing in the power supply antenna 107.

Assume that the first communication unit 106 operates as a reader/writer defined in the NFC standard.

The power supply antenna 107 is an antenna for outputting any one of the communication power and the predetermined power to the electronic apparatus 200. Further, the power supply antenna 107 is used for the first communication unit 106 to wirelessly communicate with the electronic apparatus 200 with use of the NFC standard.

The memory 108 records the computer program for controlling the power supply apparatus 100. Further, the memory 108 records data for identifying the power supply apparatus 100, power supply parameters regarding the power supply apparatus 100, flags for controlling the power supply, and the like. Further, the memory 108 records the data acquired from the electronic apparatus 200 by at least one of the first communication unit 106 and the second communication unit 113.

The display unit 109 displays video data provided from the memory 108 and the second communication unit 113.

The operation unit 110 provides a user interface for operating the power supply apparatus 100. The operation unit 110 includes a button, a switch, and a touch panel for operating the power supply apparatus 100. The control unit 101 controls the power supply apparatus 100 according to an input signal input via the operation unit 110.

The current detection unit 111 detects the current flowing in the power supply antennal 107, and provides data indicating the detected current to the control unit 101. The control unit 101 detects the presence of the foreign object with use of the data indicating the current that is provided from the current detection unit 111. The control unit 101 detects the foreign object, if the current detected by the current detection unit 111 changes by a predetermined current or larger.

The temperature detection unit 112 detects a temperature of the power supply apparatus 100, and provided data indicating the detected temperature to the control unit 101. The control unit 101 detects the presence of the foreign object with use of the data indicating the temperature that is provided from the temperature detection unit 112. The temperature of the power supply apparatus 100 that is detected by the temperature detection unit 112 may be a temperature inside the power supply apparatus 100, or may be a temperature on a surface of the power supply apparatus 100. The control unit 101 detects the foreign object, if the temperature detected by the temperature detection unit 112 changes by a predetermined temperature or larger.

The second communication unit 113 wirelessly communicates with the electronic apparatus 200 based on a different communication standard from the communication standard of the first communication unit 106. The communication standard of the second communication unit 113 is, for example, the wireless local area network (LAN) standard or the Bluetooth (registered trademark) standard. The second communication unit 113 can transmit and receive data including at least one of video data, audio data, and a command between the power supply apparatus 100 and the electronic apparatus 200.

The power supply apparatus 100 is configured to wirelessly supply the power to the electronic apparatus 200. However, the term "wirelessly" may be replaced with a phrase "in a non-contact manner" or a phrase "in a contactless manner".

Figure 3:
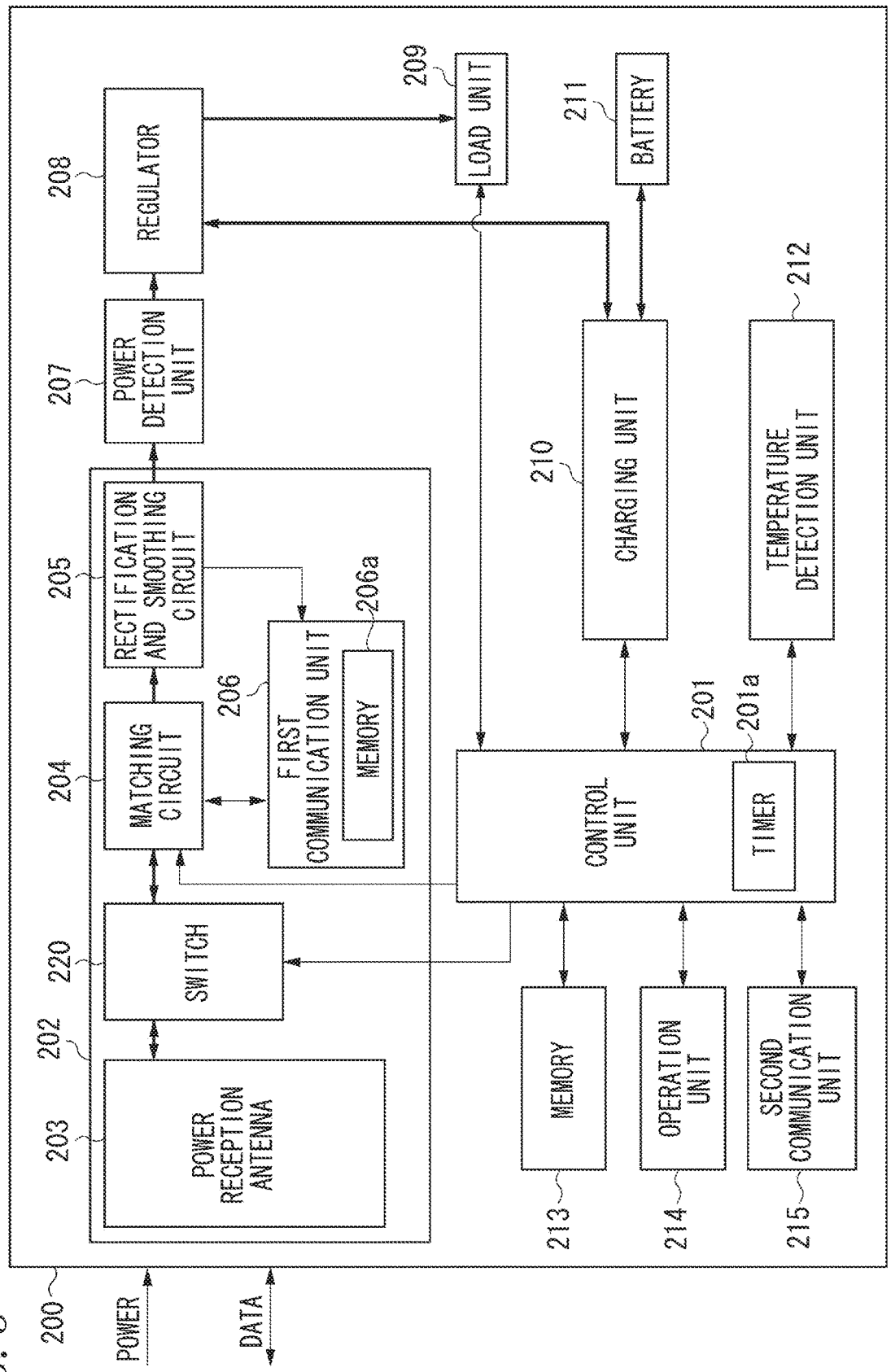
FIG. 3 is a block diagram illustrating an example of an electronic apparatus according to the first exemplary embodiment.

Next, an example of a configuration of the electronic apparatus 200 will be described with reference to FIG. 3. The electronic apparatus 200 includes a control unit 201, a power reception unit 202, a power detection unit 207, a regulator 208, a load unit 209, a charging unit 210, a battery 211, a temperature detection unit 212, a memory 213, an operation unit 214, and a second communication unit 215. The power reception unit 202 includes the power reception antenna 203, a switch (a switching unit) 220, a matching circuit 204, a rectification and smoothing circuit 205, and a first communication unit 206.

The control unit 201 controls the electronic apparatus 200 by executing a computer program recorded in the memory 213. The control unit 201 includes, for example, a CPU or an MPU. Assume that the control unit 201 is constituted by hardware. Further, the control unit 201 includes a timer 201a.

The power reception unit 202 supports the predetermined power supply method, and is used to wirelessly receive the power from the power supply apparatus 100.

The power reception antenna 203 is an antenna for receiving the power supplied from the power supply apparatus 100. Further, the power reception antenna 203 is used for the first communication unit 206 to wirelessly communicate with the power supply apparatus 100 with use of the NFC standard. The power received from the power supply apparatus 100 by the electronic apparatus 200 via the power reception antenna 203 is supplied to the rectification and smoothing circuit 205 via the matching circuit 204.

The matching circuit 204 includes a circuit for setting the resonance frequency of the power reception antenna 203. The control unit 201 can set the resonance frequency of the power reception antenna 203 by controlling the matching circuit 204.

The rectification and smoothing circuit 205 generates direct-current power from the power received by the power reception antenna 203. Further, the rectification and smoothing circuit 205 supplies the generated direct-current power to the regulator 208 via the power detection unit 207. If the data is superposed on the power received by the power reception antenna 203, the rectification and smoothing circuit 205 provides the data removed from the power received by the power reception antenna 203 to the first communication unit 206.

The switch 220 is a switch for connecting and disconnecting the power reception antenna 203 to and from the matching circuit 204, the rectification and smoothing circuit 205, and the first communication unit 206. The switch 220 is controlled by the control unit 201.

When the switch 220 is switched on by the control unit 201, the power reception antenna 203 is connected to the matching circuit 204, the rectification and smoothing circuit 205, and the first communication unit 206. When the switch 220 is switched on, the power received from the power supply apparatus 100 by the power reception antenna 203 is supplied to the rectification and smoothing circuit 205 via the matching circuit 204. Therefore, the first communication unit 206 can receive the data from the power supply apparatus 100, and the rectification and smoothing circuit 205 can supply the direct-current power generated from the power received from the power supply apparatus 100 to the regulator 208.

When the switch 220 is switched off by the control unit 201, the power reception antenna 203 is not connected to the matching circuit 204, the rectification and smoothing circuit 205, and the first communication unit 206. When the switch 220 is switched off, the power received from the power supply apparatus 100 by the power reception antenna 203 is not supplied to the rectification and smoothing circuit 205 via the matching circuit 204. Therefore, neither the first communication unit 206 can receive the data from the power supply apparatus 100 nor the rectification and smoothing circuit 205 can supply the direct-current power generated from the power received from the power supply apparatus 100 to the regulator 208. When the switch 220 is switched off, the power reception antenna 203 is not connected to the battery 211, so that the detection unit 104 and the current detection unit 111 can correctly carry out the foreign object detection without being affected by a change in a remaining capacity of the battery 211. When the switch 220 is switched off, the power reception antenna 203 is not connected to the charging unit 210 and the load unit 209, so that the detection unit 104 and the current detection unit 111 can correctly carry out the foreign object detection without being affected by a change in an operation, a change in the load, and the like of the electronic apparatus 200. Even when the switch 220 is switched off, at least one of power discharged from the battery 211 and the power received by the power reception antenna 203 is supplied to the control unit 201.

The first communication unit 206 communicates with the power supply apparatus 100 based on the same communication standard as the first communication unit 106. The first communication unit 206 includes a memory 206a. Wireless Power Transfer (WPT) Record Type Definition (RTD) data 400 is recorded in the memory 206a. A plurality of pieces of data in compliance with NDEF is stored in the WPT RTD data 400. Data required to carry out the wireless power supply between the power supply apparatus 100 and the electronic apparatus 200 is stored in the WPT RTD data 400.

At least authentication data that is used to authenticate the wireless power supply with the power supply apparatus 100 is stored in the WPT RTD data 400. The authentication data includes a record type name, data indicating a power supply method and/or a control protocol for the power supply that the electronic apparatus 200 supports, data for identifying the electronic apparatus 200, data indicating a power reception capability of the electronic apparatus 200, and/or data indicating a type of a tag that the electronic apparatus 200 has. The record type name is data indicating a record type for identifying a content and a structure of the data stored in the WPT RTD data 400. The record type name is data for identifying the WPT RTD data 400. The data indicating the power reception capability is data indicating the capability of the electronic apparatus 200 for receiving the power, and indicates, for example, a maximum value of the power that the electronic apparatus 200 can receive.

Further, power reception status data and power supply status data are stored in the WPT RTD data 400. The power reception status data includes data indicating a state of the electronic apparatus 200. For example, the power reception status data includes a value of request power requested to the power supply apparatus 100, a value of the power received from the power supply apparatus 100 by the electronic apparatus 200, data regarding the remaining capacity of the battery 211 and/or charging of the battery 211, and/or error data regarding an error in the electronic apparatus 200. The error data includes data indicating whether an error occurs in the electronic apparatus 200, and data indicating a type of the error occurring in the electronic apparatus 200. The power reception status data may further include information indicating whether the electronic apparatus 200 supports a foreign object detection process.

The power supply status data includes data indicating a state of the power supply apparatus 100. For example, the power supply status data includes the data for identifying the power supply apparatus 100, data indicating whether the power supply apparatus 100 starts the transmission of the predetermined power to the electronic apparatus 200, the power supply parameters set at the power supply apparatus 100, and/or information indicating whether the power supply apparatus 100 performs the foreign object detection process. The first communication unit 206 analyzes the data provided from the rectification and smoothing circuit 205. After that, the first communication unit 206 transmits the data read out from the WPT RTD data 400 to the power supply apparatus 100 and writes the data received from the power supply apparatus 100 into the WPT RTD data 400 with use of a result of the analysis of the data. Further, the first communication unit 206 transmits response data corresponding to the data provided from the rectification and smoothing circuit 205 to the power supply apparatus 100.

The first communication unit 206 performs a process for changing a load inside the first communication unit 206 to transmit the data read out from the WPT RTD data 400 and the response data to the power supply apparatus 100.

Figure 4:
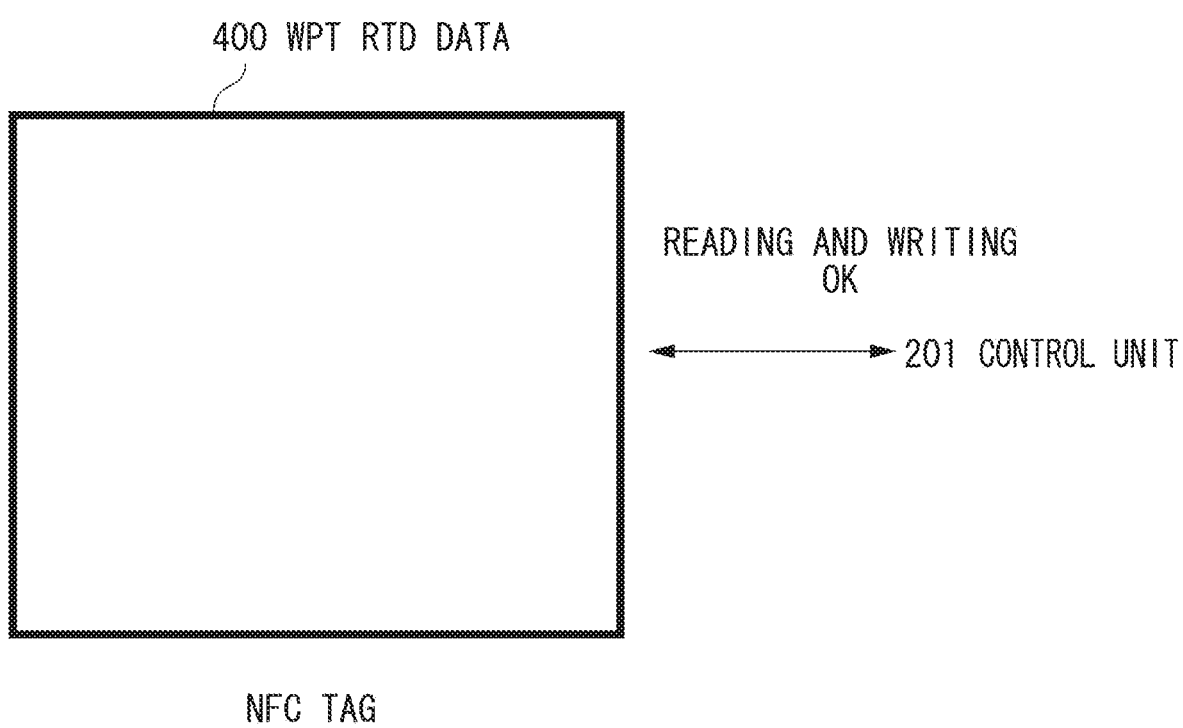
FIG. 4 illustrates an example of a tag of the electronic apparatus according to the first exemplary embodiment.

The electronic apparatus 200 has a tag defined in the NFC standard. The tag that the electronic apparatus 200 has will be described with reference to FIG. 4. The control unit 201 can read out the data stored in the WPT RTD data 400 via an internal bus interface (not illustrated). Further, the control unit 201 can write the data into the WPT RTD data 400 via the internal bus interface (not illustrated).

The control unit 201 can, for example, control each of the units of the electronic apparatus 200 with use of the power supply status data read out from the WPT RTD data 400. The control unit 201 can, for example, periodically detect the power reception status data with use of data provided from each of the units of the electronic apparatus 200, and write the detected power reception status data into the WPT RTD data 400. The term "tag" as the tag that the electronic apparatus 200 has may be replaced with a term "active tag" or a term "dynamic tag".

The power supply apparatus 100 can read out the data stored in the WPT RTD data 400 with use of the first communication unit 106. Further, in this case, the power supply apparatus 100 can also write the data into the WPT RTD data 400 with use of the first communication unit 106.

The power detection unit 207 detects the power received via the power reception antenna 203, and provides data indicating the detected power to the control unit 201.

The control unit 201 determines whether a first error occurs in the electronic apparatus 200 with use of the data indicating the power that is provided from the power detection unit 207. The first error is, for example, an error that occurs when the electronic apparatus 200 receives higher power from the power supply apparatus 100 than the maximum value of the power that the electronic apparatus 200 can receive.

For example, the control unit 201 compares the maximum value of the power that the electronic apparatus 200 can receive and a value of the power detected by the power detection unit 207, and determines whether the first error occurs in the electronic apparatus 200 with use of a result of the comparison. If the power detected by the power detection unit 207 is higher than the maximum value of the power that the electronic apparatus 200 can receive, the control unit 201 determines that the first error occurs in the electronic apparatus 200. If the power detected by the power detection unit 207 is the maximum value of the power that the electronic apparatus 200 can receive, or lower, the control unit 201 determines that the first error does not occur in the electronic apparatus 200. If determining that the first error occurs in the electronic apparatus 200, the control unit 201 writes the power reception status data including data indicating that an error occurs in the electronic apparatus 200 and data indicating the first error into the WPT RTD data 400.

Further, the control unit 201 determines whether a second error occurs in the electronic apparatus 200 with use of the data indicating the power that is provided from the power detection unit 207. The second error is, for example, an error that occurs when the power received from the power supply apparatus 100 by the electronic apparatus 200 is short of the request power requested to the power supply apparatus 100 by the electronic apparatus 200.

For example, the control unit 201 compares a value of the request power and the value of the power detected by the power detection unit 207, and determines whether the second error occurs in the electronic apparatus 200 with use of a result of the comparison.

If the value of the power detected by the power detection unit 207 is smaller than the value of the request power, the control unit 201 determines that the second error occurs in the electronic apparatus 200. If the value of the power detected by the power detection unit 207 is the value of the request power or larger, the control unit 201 determines that the second error does not occur in the electronic apparatus 200. If determining that the second error occurs in the electronic apparatus 200, the control unit 201 writes the power reception status data including the data indicating that an error occurs in the electronic apparatus 200 and data indicating the second error into the WPT RTD data 400.

The regulator 208 supplies at least one of the power supplied from the rectification and smoothing circuit 205 and the power supplied from the battery 211 to each of the units of the electronic apparatus 200 according to an instruction from the control unit 201.

The load unit 209 includes an imaging unit that generates image data, such as a still image and a moving image, from an optical image of an object, and/or a reproduction unit that reproduces the image data.

The charging unit 210 charges the battery 211. The charging unit 210 controls whether to charge the battery 211 with use of the power supplied from the regulator 208, or to supply the power discharged from the battery 211 to the regulator 208, according to an instruction from the control unit 201. The charging unit 210 periodically detects the remaining capacity of the battery 211, and provides the data indicating the remaining capacity of the battery 211 and the data regarding the charging of the battery 211 to the control unit 201.

The battery 211 is a battery connectable to the electronic apparatus 200. Further, the battery 211 is a chargeable secondary battery, and is, for example, a lithium-ion battery. The battery 211 may be a battery other than the lithium-ion battery.

The control unit 201 determines whether a third error occurs in the electronic apparatus 200 according to whether the electronic apparatus 200 and the battery 211 are connected to each other. The third error is, for example, an error that occurs when the battery 211 is not connected to the electronic apparatus 200. If the electronic apparatus 200 and the battery 211 are not connected to each other, the control unit 201 determines that the third error occurs in the electronic apparatus 200. If the electronic apparatus 200 and the battery 211 are connected to each other, the control unit 201 determines that the third error does not occur in the electronic apparatus 200. If determining that the third error occurs in the electronic apparatus 200, the control unit 201 writes the power reception status data including the data indicating that an error occurs in the electronic apparatus 200 and data indicating the third error into the WPT RTD data 400.

The temperature detection unit 212 detects a temperature of the electronic apparatus 200, and provides data indicating the detected temperature to the control unit 201. The control unit 201 determines whether a fourth error occurs in the electronic apparatus 200 with use of the data indicating the temperature that is provided from the temperature detection unit 212. The fourth error is, for example, an error that occurs when the temperature in the electronic apparatus 200 increases to a high temperature.

The control unit 201 compares a setting value and the temperature detected by the temperature detection unit 212, and determines whether the fourth error occurs in the electronic apparatus 200 with use of a result of the comparison. The setting value is, for example, an upper limit value of the temperature that is set to allow the battery 211 to be normally charged. Alternatively, the setting value may be, for example, an upper limit value of the temperature that is set to protect the power reception unit 202 and the load unit 209. If the temperature detected by the temperature detection unit 212 is higher than the setting value, the control unit 201 determines that the fourth error occurs in the electronic apparatus 200. If the temperature detected by the temperature detection unit 212 is the setting value or lower, the control unit 201 determines that the fourth error does not occur in the electronic apparatus 200. If determining that the fourth error occurs in the electronic apparatus 200, the control unit 201 writes the power reception status data including the data indicating that an error occurs in the electronic apparatus 200 and data indicating the fourth error into the WPT RTD data 400.

The memory 213 stores data such as the computer program for controlling the electronic apparatus 200 and a parameter regarding the electronic apparatus 200.

The operation unit 214 provides a user interface for operating the electronic apparatus 200. The control unit 201 controls the electronic apparatus 200 according to an input signal input via the operation unit 214.

The second communication unit 215 wirelessly communicates with the power supply apparatus 100. The second communication unit 215 wirelessly communicates with the power supply apparatus 100 based on, for example, the same communication standard as the second communication unit 113.

(State Transition Diagram of Power Supply Apparatus 100)

Figure 5:
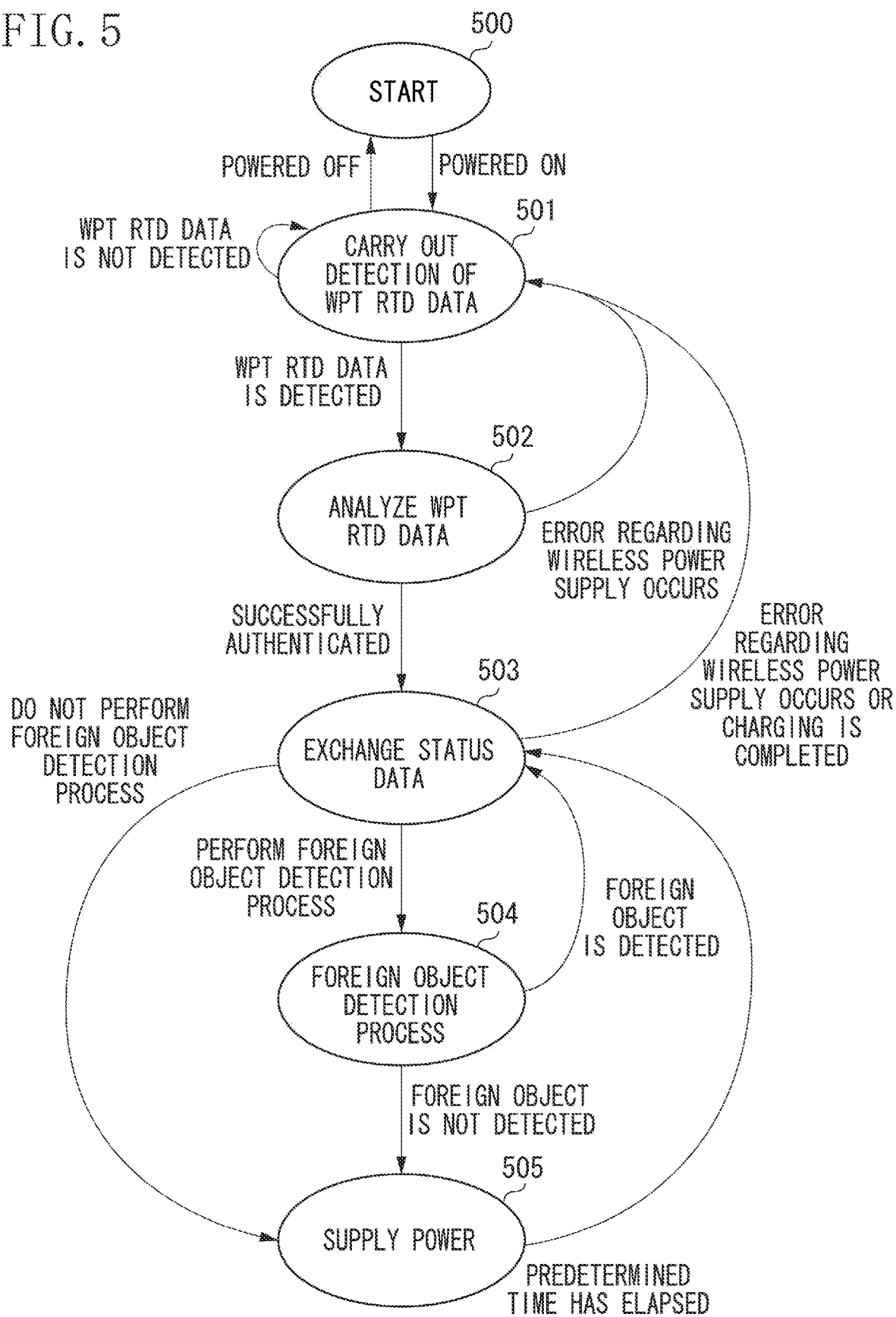
FIG. 5 is an example of a state transition diagram of the power supply apparatus according to the first exemplary embodiment.

A transition of the state of the power supply apparatus 100 according to the first exemplary embodiment will be described with reference to FIG. 5. In FIG. 5, a state 500 is a state in which the AC power source (not illustrated) and the power supply apparatus 100 are connected to each other, and the power supply apparatus 100 is powered off. When the power supply apparatus 100 is powered on with use of the operation unit 110 while being in the state 500, the state of the power supply apparatus 100 transitions to a state 501.

In the state 501, the power supply apparatus 100 performs a process for detecting the WPT RTD data 400. If the power supply apparatus 100 is powered off while being in the state 501, the state of the power supply apparatus 100 transitions to the state 500. If the power supply apparatus 100 detects the WPT RTD data 400 while being in the state 501, the state of the power supply apparatus 100 transitions to a state 502. If the power supply apparatus 100 does not detect the WPT RTD data 400 for the wireless power supply, the power supply apparatus 100 is kept in the state 501 until detecting the WPT RTD data 400.

In the state 502, the power supply apparatus 100 performs a process for analyzing the detected WPT RTD data 400. If the wireless power supply between the power supply apparatus 100 and the electronic apparatus 200 is successfully authenticated as a result of the analysis of the WPT RTD data 400 while the power supply apparatus 100 is in the state 502, the state of the power supply apparatus 100 transitions to a state 503. If an error regarding the wireless power supply occurs while the power supply apparatus 100 is in the state 502, the state of the power supply apparatus 100 transitions to the state 501. Examples of the error regarding the wireless power supply include a communication error regarding the communication between the power supply apparatus 100 and the electronic apparatus 200, an error regarding the electronic apparatus 200, and an authentication error regarding the authentication of the wireless power supply between the power supply apparatus 100 and the electronic apparatus 200.

In the state 503, the power supply apparatus 100 performs a process for exchanging the status data required to carry out the wireless power supply with the electronic apparatus 200. When being in the state 503, the power supply apparatus 100 receives the power reception status data from the electronic apparatus 200, and transmits the power supply status data to the electronic apparatus 200.

If the exchange of the status data is completed and the power supply apparatus 100 determines to perform the foreign object detection process while the power supply apparatus 100 is in the state 503, the state of the power supply apparatus 100 transitions to a state 504. The foreign object detection process will be described below. If the exchange of the status data is completed and the power supply apparatus 100 determines not to perform the foreign object detection process while the power supply apparatus 100 is in the state 503, the state of the power supply apparatus 100 transitions to a state 505.

If the error regarding the wireless power supply occurs while the power supply apparatus 100 is in the state 503, the state of the power supply apparatus 100 transitions to the state 501. If the power supply apparatus 100 detects that the charging of the electronic apparatus 200 is completed while being in the state 503, the state of the power supply apparatus 100 transitions to the state 501.

In the state 504, the power supply apparatus 100 performs the foreign object detection process for detecting the foreign object. If the power supply apparatus 100 detects the foreign object after performing the foreign object detection process in the state 504, the state of the power supply apparatus 100 transitions to the state 503. If the power supply apparatus 100 does not detect the foreign object after performing the foreign object detection process in the state 504, the state of the power supply apparatus 100 transitions to the state 505. The foreign object detection process will be described below.

In the state 505, the power supply apparatus 100 performs a power supply process for supplying the predetermined power to the electronic apparatus 200. If the error regarding the wireless power supply occurs while the power supply apparatus 100 is in the state 504, the state of the power supply apparatus 100 transitions from the state 504 to the state 503. After the predetermined time has elapsed since the start of the output of the predetermined power while the power supply apparatus 100 is in the state 504, the state of the power supply apparatus 100 transitions to the state 503.

(Control Process)

Figure 6:
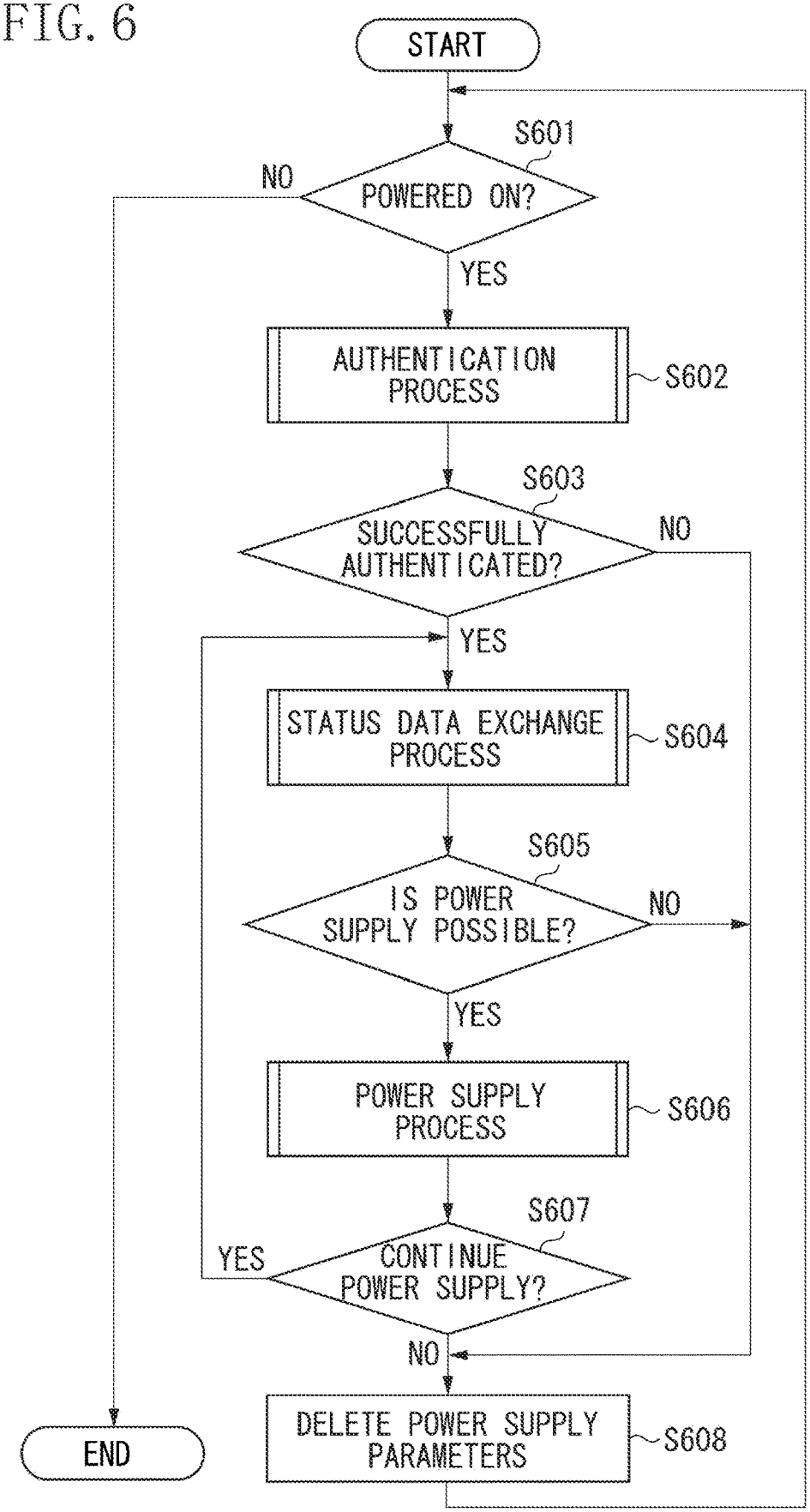
FIG. 6 is a flowchart illustrating an example of a control process performed by the power supply apparatus according to the first exemplary embodiment.

Next, a control process for controlling the wireless power supply of the power supply apparatus 100 according to the first exemplary embodiment will be described with reference to a flowchart illustrated in FIG. 6. The control unit 101 executes the computer program stored in the memory 108, by which the control process can be realized.

In step S601, the control unit 101 detects whether the power supply apparatus 100 is powered on. If the control unit 101 detects that the power supply apparatus 100 is powered on (YES in step S601), the process proceeds to step S602. If the control unit 101 detects that the power supply apparatus 100 is not powered on (NO in step S601), the process ends.

In step S602, the control unit 101 performs an authentication process, which will be described below. Upon the execution of the authentication process, the process proceeds to step S603.

In step S603, the control unit 101 determines whether the wireless power supply between the power supply apparatus 100 and the electronic apparatus 200 is successfully authenticated. When the authentication process is performed in step S602, any one of an authentication success flag or an authentication failure flag is set into the memory 108. If the authentication success flag is set in the memory 108, the control unit 101 determines that the wireless power supply is successfully authenticated (YES in step S603), and then the process proceeds to step S604. If the authentication failure flag is set in the memory 108, the control unit 101 determines that the wireless power supply fails to be authenticated (NO in step S603), and then the process proceeds to step S608.

In step S604, the control unit 101 performs status data exchange process, which will be described below. Upon the execution of the status data exchange process, the process proceeds to step S605.

In step S605, the control unit 101 determines whether the power supply apparatus 100 can supply the power to the electronic apparatus 200. When the status data exchange process is performed in step S604, any one of a power supply possible flag and a power supply impossible flag is set into the memory 108. If the power supply possible flag is set in the memory 108, the control unit 101 determines that the power supply apparatus 100 can supply the power to the electronic apparatus 200 (YES in step S605), and then the process proceeds to step S606. If the power supply impossible flag is set in the memory 108, the control unit 101 determines that the power supply apparatus 100 cannot supply the power to the electronic apparatus 200 (NO in step S605), and then the process proceeds to step S608.

In step S606, the control unit 101 performs a power supply process, which will be described below. Upon the execution of the power supply process, the process proceeds to step S607.

In step S607, the control unit 101 determines whether the power supply apparatus 100 will continue the power supply to the electronic apparatus 200. When the power supply process is performed in step S606, any one of a power supply continuation flag and a power supply stop flag is set into the memory 108. If the power supply continuation flag is set in the memory 108, the control unit 101 determines that the power supply apparatus 100 will continue the power supply to the electronic apparatus 200 (YES in step S607), and then the process returns to step S604. If the power supply stop flag is set in the memory 108, the control unit 101 determines that the power supply apparatus 100 will not continue the power supply to the electronic apparatus 200 (NO in step S607), and then the process proceeds to step S608.

In step S608, the control unit 101 deletes the power supply parameters, the flags regarding the control of the power supply, and the like stored in the memory 108. Then, the process returns to step S601.

(Authentication Process)

Figure 7:
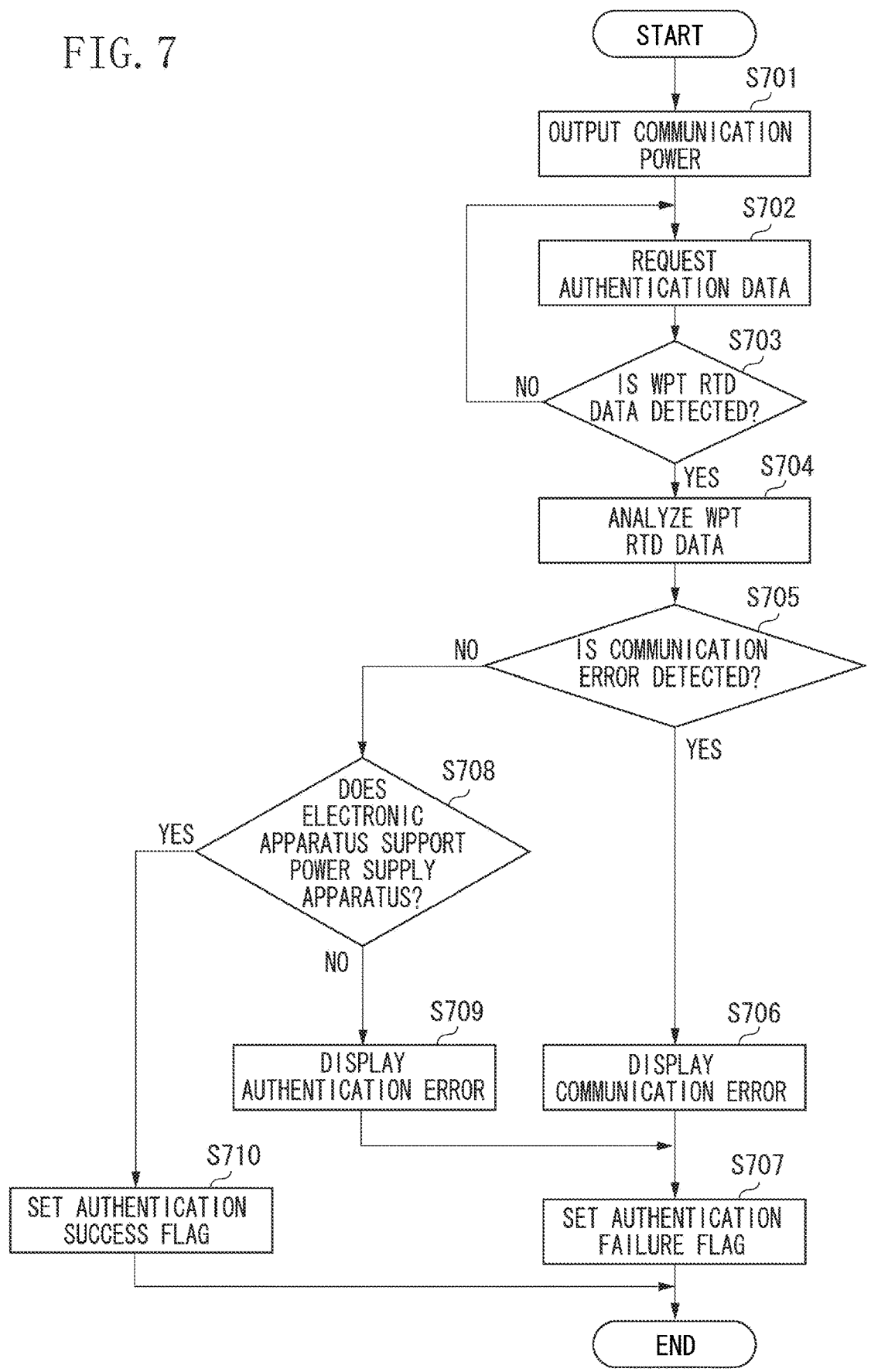
FIG. 7 is a flowchart illustrating an example of an authentication process performed by the power supply apparatus according to the first exemplary embodiment.

Next, the authentication process performed by the control unit 101 in step S602 illustrated in FIG. 6 according to the first exemplary embodiment will be described with reference to a flowchart illustrated in FIG. 7. The control unit 101 executes the computer program stored in the memory 108, by which the authentication process can be realized.

In step S701, the control unit 101 controls the power supply unit 102 so as to output the communication power. The control unit 101 controls the power supply unit 102 so as to output the communication power via the power supply antenna 107 until a start of a process for outputting the predetermined power. Then, the process proceeds to step S702.

In step S702, the control unit 101 controls the first communication unit 106 so as to transmit data requesting the authentication data. Then, the process proceeds to step S703.

In step S703, the control unit 101 determines whether the WPT RTD data 400 is detected. When the first communication unit 106 receives the authentication data from the electronic apparatus 200, the control unit 101 acquires the record type name of the electronic apparatus 200 from the authentication data of the electronic apparatus 200. After that, the control unit 101 determines whether the WPT RTD data 400 is detected based on the record type name of the electronic apparatus 200. If the WPT RTD data 400 is detected (YES in step S703), the process proceeds to step S704. If the WPT RTD data 400 is not detected (NO in step S703), the process returns to step S702. If the authentication data is not received from the electronic apparatus 200 by the first communication unit 106, the process also returns to step S702.

In step S704, the control unit 101 analyzes the WPT RTD data 400 of the electronic apparatus 200 by checking the data included in the authentication data of the electronic apparatus 200. Then, the process proceeds to step S705.

In step S705, the control unit 101 detects whether the communication error occurs in the authentication data of the electronic apparatus 200 with use of a result of the analysis in step S704. If the communication error is detected in the authentication data of the electronic apparatus 200 (YES in step S705), the process proceeds to step S706. If the communication error is not detected in the authentication data of the electronic apparatus 200 (NO in step S705), the process proceeds to step S708.

In step S706, the control unit 101 causes the display unit 109 to display data indicating that the communication error between the power supply apparatus 100 and the electronic apparatus 200 is detected. Then, the process proceeds to step S707.

In step S707, the control unit 101 sets the authentication failure flag into the memory 108. Then, the process exits the flowchart illustrated in FIG. 7, and proceeds to step S603 illustrated in FIG. 6.

In step S708, the control unit 101 determines whether the electronic apparatus 200 supports the power supply apparatus 100 with use of the result of the analysis in step S704.

For example, if the power supply method that the power supply apparatus 100 supports and the power supply method that the electronic apparatus 200 supports match each other, the control unit 101 determines that the electronic apparatus 200 supports the power supply apparatus 100 (YES in step S708). On the other hand, if the power supply method that the power supply apparatus 100 supports and the power supply method that the electronic apparatus 200 supports do not match each other, the control unit 101 determines that the electronic apparatus 200 does not support the power supply apparatus 100 (NO in step S708).

Alternatively, for example, if the control protocol for the power supply that the power supply apparatus 100 supports and the control protocol for the power supply that the electronic apparatus 200 supports match each other, the control unit 101 determines that the electronic apparatus 200 supports the power supply apparatus 100 (YES in step S708). On the other hand, if the control protocol for the power supply that the power supply apparatus 100 supports and the control protocol for the power supply that the electronic apparatus 200 supports do not match each other, the control unit 101 determines that the electronic apparatus 200 does not support the power supply apparatus 100 (NO in step S708).

If the electronic apparatus 200 does not support the power supply apparatus 100 (NO in step S708), the process proceeds to step S709. If the electronic apparatus 200 supports the power supply apparatus 100 (YES in step S708), the process proceeds to step S710.

In step S709, the control unit 101 causes the display unit 109 to display data indicating that the authentication error between the power supply apparatus 100 and the electronic apparatus 200 is detected. Then, the process proceeds to step S707.

In step S710, the control unit 101 sets the authentication success flag into the memory 108. Then, the process exits the flowchart illustrated in FIG. 7, and proceeds to step S603 illustrated in FIG. 6.

During a period between steps S701 and S702, the control unit 101 may perform a process specified in NFC Digital Protocol in the NFC standard.

(Status Data Exchange Process)

Next, the status data exchange process performed by the control unit 101 in step S604 illustrated in FIG. 6 according to the first exemplary embodiment will be described with reference to a flowchart illustrated in FIG. 8. The control unit 101 executes the computer program stored in the memory 108, by which the status data exchange process can be realized.

In step S801, the control unit 101 controls the first communication unit 106 so as to transmit data requesting the power reception status data. Then, the process proceeds to step S802.

In step S802, the control unit 101 determines whether the power reception status data is received from the electronic apparatus 200 by the first communication unit 106 during a period since the issue of the request for the power reception status data to the electronic apparatus 200 until a preset time has elapsed. If the control unit 101 determines that the power reception status data is received from the electronic apparatus 200 by the first communication unit 106 (YES in step S802), the process proceeds to step S805. If the control unit 101 determines that the power reception status data is not received from the electronic apparatus 200 by the first communication unit 106 even after the preset time has elapsed since the issue of the request for the power reception status data (NO in step S802), the process proceeds to step S803.

In step S803, the control unit 101 causes the display unit 109 to display the data indicating that the communication error is detected, similarly to step S706. Then, the process proceeds to step S804.

In step S804, the control unit 101 sets the power supply impossible flag into the memory 108. Then, the process exits the flowchart illustrated in FIG. 8, and proceeds to step S605 illustrated in FIG. 6.

In step S805, the control unit 101 determines whether the charging of the electronic apparatus 200 is completed with use of the power reception status data received by the first communication unit 106. If the control unit 101 determines that the charging of the electronic apparatus 200 is completed (YES in step S805), the process proceeds to step S806. If the control unit 101 determines that the charging of the electronic apparatus 200 is not completed (NO in step S805), the process proceeds to step S807.

In step S806, the control unit 101 causes the display unit 109 to display data indicating that the charging of the electronic apparatus 200 is completed. Alternatively, the control unit 101 may cause the display unit 109 to display data indicating that the battery 211 is fully charged. Then, the process proceeds to step S804.

In step S807, the control unit 101 determines whether an error occurs in the electronic apparatus 200 with use of the power reception status data received by the first communication unit 106. For example, the control unit 101 determines whether an error occurs in the electronic apparatus 200 by detecting the error data from the power reception status data of the electronic apparatus 200, and analyzing the error data.

If the control unit 101 determines that an error occurs in the electronic apparatus 200 (YES in step S807), the process proceeds to step S808. If the control unit 101 determines that no error occurs in the electronic apparatus 200 (NO in step S807), the process proceeds to step S809.

In step S808, the control unit 101 causes the display unit 109 to display data indicating that an error occurs in the electronic apparatus 200. Further, the control unit 101 may cause the display unit 109 to display data indicating the type of the error occurring in the electronic apparatus 200.

Then, the process proceeds to step S804.

In step S809, the control unit 101 sets the power supply parameters with use of the power reception status data received by the first communication unit 106. The power supply parameters are the value of the predetermined power and the predetermined time. For example, the control unit 101 sets the value of the predetermined power and the predetermined time based on the power requested from the electronic apparatus 200, and efficiency of the power supply from the power supply apparatus 100 to the electronic apparatus 200. The efficiency of the power supply from the power supply apparatus 100 to the electronic apparatus 200 indicates a ratio of the power received by the electronic apparatus 200 to the power output from the power supply apparatus 100. Alternatively, for example, the control unit 101 may set the value of the predetermined power and the predetermined time based on the remaining capacity of the battery 211. The control unit 101 stores the set power supply parameters into the memory 108. Then, the process proceeds to step S810.

In step S810, the control unit 101 determines whether the power supply apparatus 100 has to perform the foreign object detection process. If the control unit 101 determines that the power supply apparatus 100 has to perform the foreign object detection process (YES in step S810), the process proceeds to step S811. If the control unit 101 determines that the power supply apparatus 100 does not have to perform the foreign object detection process (NO in step S810), the process proceeds to step S816.

For example, the control unit 101 determines whether the power supply apparatus 100 has to perform the foreign object detection process according to a magnitude of the predetermined power set in step S809. If the predetermined power set in step S809 is higher than a first value, the control unit 101 determines that the power supply apparatus 100 has to perform the foreign object detection process (YES in step S810). This is because, if the predetermined power set in step S809 is higher than the first value, the predetermined power output from the power supply antenna 107 may affect the foreign object. On the other hand, if the predetermined power set in step S809 is the first value or lower, the control unit 101 determines that the power supply apparatus 100 does not have to perform the foreign object detection process (NO in step S810). This is because, if the predetermined power set in step S809 is the first value or lower, the predetermined power output from the power supply antenna 107 little affects the foreign object. Assume that the first value is, for example, 1 W. However, the first value is not limited to 1 W, and may be any value as long as this value is set according to a magnitude of power expected to affect the foreign object.

Alternatively, for example, the control unit 101 determines whether the power supply apparatus 100 has to perform the foreign object detection process according to a length of the predetermined time set in step S809. If the predetermined time set in step S809 is a second value or longer, the control unit 101 determines that the power supply apparatus 100 has to perform the foreign object detection process (YES in step S810). This is because, if the predetermined time set in step S809 is the second value or longer, the predetermined power output from the power supply antenna 107 until the predetermined time has elapsed may affect the foreign object. On the other hand, if the predetermined time set in step S809 is not the second value or longer, the control unit 101 determines that the power supply apparatus 100 does not have to perform the foreign object detection process (NO in step S810). This is because, if the predetermined time set in step S809 is not the second value or longer, the predetermined power output from the power supply antenna 107 until the predetermined time has elapsed little affects the foreign object. Assume that the second value is, for example, 60 seconds. However, the second value is not limited to 60 seconds, and may be any value as long as this value is set according to a length of a time of the power supply that is expected to affect the foreign object.

Alternatively, for example, the control unit 101 detects the remaining capacity of the battery 211 from the power reception status data acquired from the electronic apparatus 200 in step S802, and determines whether the power supply apparatus 100 has to perform the foreign object detection process according to the remaining capacity of the battery 211. If the remaining capacity of the battery 211 is a third value or larger, the control unit 101 determines that the power supply apparatus 100 does not have to perform the foreign object detection process (NO in step S810). This is because, if the remaining capacity of the battery 211 is the third value or larger, this leads to a reduction in the predetermined time and a reduction in the magnitude of the predetermined power, so that the power output from the power supply antenna 107 little affects the foreign object. On the other hand, if the remaining capacity of the battery 211 is not the third value or larger, the control unit 101 determines that the power supply apparatus 100 has to perform the foreign object detection process (YES in step S810). This is because, if the remaining capacity of the battery 211 is not the third value or larger, this leads to an increase in the predetermined time and an increase in the magnitude of the predetermined power, so that the power output from the power supply antenna 107 may affect the foreign object. Assume that the third value is, for example, a value corresponding to a capacity equivalent to 90% of a total capacity of the battery 211. However, the third value is not limited to the value corresponding to the capacity equivalent to 90% of the total capacity of the battery 211.

Alternatively, the control unit 101 detects the request power requested from the electronic apparatus 200 from the power reception status data acquired from the electronic apparatus 200 in step S802, and determines whether the power supply apparatus 100 has to perform the foreign object detection process according to whether the request power increases. If the request power increases, the control unit 101 determines that the power supply apparatus 100 has to perform the foreign object detection process (YES in step S810). This is because, if the request power increases, this leads to an increase in the magnitude of the predetermined power output from the power supply antenna 107, and thus an increase in the influence of this power on the foreign object. On the other hand, if the request power does not increase, the control unit 101 determines that the power supply apparatus 100 does not have to perform the foreign object detection process (NO in step S810). This is because, if the request power does not increase, this does not lead to the increase in the influence of the predetermined power output from the power supply antenna 107 on the foreign object. However, even when the request power increases, the control unit 101 may determine that the power supply apparatus 100 does not have to perform the foreign object detection process (NO in step S810) if the increase in the request power is not a fourth value or larger. In this case, if the increase in the request power is the fourth value or larger, the control unit 101 determines that the power supply apparatus 100 has to perform the foreign object detection process (YES in step S810). Assume that the fourth value is 1 W. However, the fourth value is not limited to 1 W, and may be any value as long as this value is set according to the magnitude of the power expected to affect the foreign object.

In step S811, the control unit 101 sets a foreign object detection process execution flag into the memory 108. Upon this setting, the process proceeds to step S812.

In step S812, the control unit 101 controls the first communication unit 106 so as to transmit the power supply status data including information indicating to perform the foreign object detection process, and the power supply parameters set in step S809. Then, the process proceeds to step S813. The information indicating to perform the foreign object detection process includes information indicating a method for detecting the foreign object, and information indicating a detection time. The detection time is a time during which the power supply apparatus 100 performs the foreign object detection process. The information indicating the method for detecting the foreign object includes, for example, at least one of information indicating to carry out the foreign object detection with use of the VSWR, information indicating to carry out the foreign object detection with use of the current flowing in the power supply antenna 107, and information indicating to carry out the foreign object detection with use of the temperature of the power supply apparatus 100.

In step S813, the control unit 101 determines whether the response data is received from the electronic apparatus 200 by the first communication unit 106. If the response data is not received from the electronic apparatus 200 by the first communication unit 106 (NO in step S813), the process proceeds to step S814. If the response data is received from the electronic apparatus 200 by the first communication unit 106 (YES in step S813), the process proceeds to step S815. In step S814, the control unit 101 causes the display unit 109 to display the data indicating that the communication error is detected, similarly to step S803. Then, the process proceeds to step S804.

In step S815, the control unit 101 sets the power supply possible flag into the memory 108. Then, the process exits the flowchart illustrated in FIG. 8, and proceeds to step S605 illustrated in FIG. 6.

In step S816, the control unit 101 resets the foreign object detection process execution flag into the memory 108. Then, the process proceeds to step S817.

In step S817, the control unit 101 controls the first communication unit 106 so as to transmit the power supply status data including information indicating not to perform the foreign object detection process, and the power supply parameters set in step S809. Then, the process proceeds to step S813.

When the electronic apparatus 200 receives the power supply status data indicating to perform the foreign object detection process from the power supply apparatus 100, the first communication unit 206 transmits the response data to the power supply apparatus 100 according to whether the electronic apparatus 200 supports the foreign object detection process. If the electronic apparatus 200 supports the foreign object detection process included in the power supply status data indicating to perform the foreign object detection process, the first communication unit 206 transmits information indicating that the electronic apparatus 200 supports the foreign object detection process to the power supply apparatus 100. If the electronic apparatus 200 does not support the foreign object detection process included in the power supply status data indicating to perform the foreign object detection process, the first communication unit 206 transmits information indicating that the electronic apparatus 200 does not support the foreign object detection process to the power supply apparatus 100. The power supply apparatus 100 is configured to perform the process of step S804 without performing the process of step S815, if receiving the information indicating that the electronic apparatus 200 does not support the foreign object detection process from the electronic apparatus 200 after transmitting the power supply status data indicating to perform the foreign object detection process to the electronic apparatus 200. The power supply apparatus 100 performs the process of step S815, if receiving the information indicating that the electronic apparatus 200 supports the foreign object detection process from the electronic apparatus 200 after transmitting the power supply status data indicating to perform the foreign object detection process to the electronic apparatus 200.

(Power Supply Process)

Figure 9B:
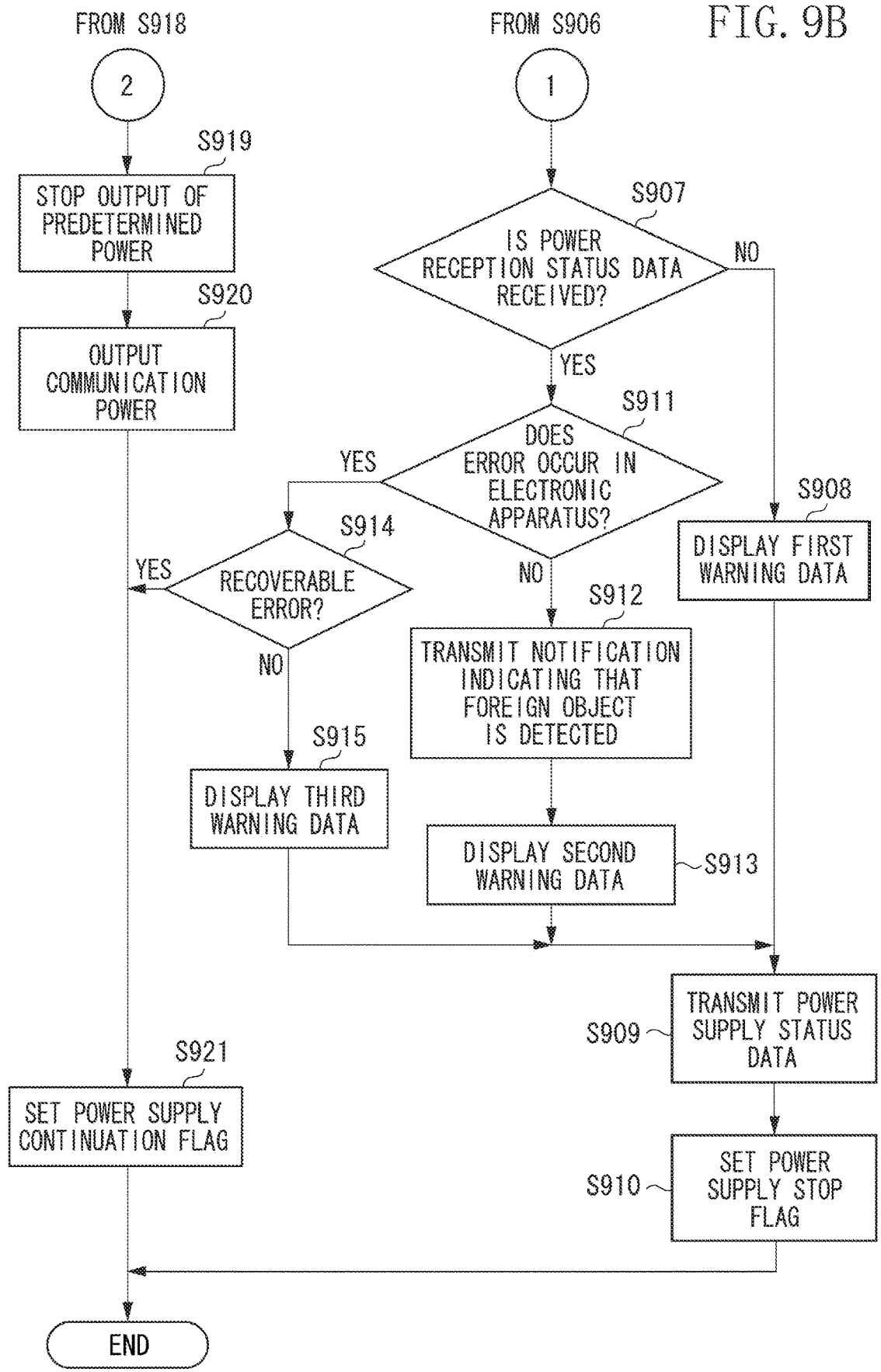
FIG. 9 (consisting of FIGS. 9A and 9B) is a flowchart illustrating an example of a power supply process performed by the power supply apparatus according to the first exemplary embodiment.

Next, the power supply process performed by the control unit 101 in step S606 illustrated in FIG. 6 according to the first exemplary embodiment will be described with reference to a flowchart illustrated in FIG. 9. The control unit 101 executes the computer program stored in the memory 108, by which the power supply process can be realized.

In step S901, the control unit 101 determines whether to perform the foreign object detection process according to whether the foreign object detection process execution flag is set in the memory 108. If the foreign object detection process execution flag stored in the memory 108 is set (YES in step S901), the control unit 101 determines to perform the foreign object detection process. In this case, the process proceeds to step S902. If the foreign object detection process execution flag stored in the memory 108 is reset (NO in step S901), the control unit 101 determines not to perform the foreign object detection process. In this case, the process proceeds to step S917.

In step S902, the control unit 101 performs the foreign object detection process. If the information indicating the method for detecting the foreign object that has been transmitted to the electronic apparatus 200 includes the information indicating to carry out the foreign object detection with use of the VSWR, the foreign object detection process is performed as a process for detecting the foreign object with use of the data indicating the VSWR that is provided from the detection unit 104. If the information indicating the method for detecting the foreign object that has been transmitted to the electronic apparatus 200 includes the information indicating to carry out the foreign object detection with use of the current flowing in the power supply antenna 107, the foreign object detection process is performed as a process for detecting the foreign object with use of the data indicating the current that is provided from the power detection unit 111. If the information indicating the method for detecting the foreign object that has been transmitted to the electronic apparatus 200 includes the information indicating to carry out the foreign object detection with use of the temperature of the power supply apparatus 100, the foreign object detection process is performed as a process for detecting the foreign object with use of the data indicating the temperature that is provided from the temperature detection unit 112.

Upon the execution of the foreign object detection process, the process proceeds to step S903. The control unit 101 controls the timer 101a so as to measure a time elapsed since the start of the foreign object detection process.

In step S903, the control unit 101 determines whether the foreign object is detected. If the foreign object is detected (YES in step S903), the process proceeds to step S904. If the foreign object is not detected (NO in step S903), the process proceeds to step S916.

In step S904, the control unit 101 controls the power supply unit 102 so as to limit the output of the power by the power supply apparatus 100. In step S904, the control unit 101 may control the power supply unit 102 so as to reduce the power output from the power supply antenna 107, or may control the power supply unit 102 so as to prevent the power from being output from the power supply antenna 107. Then, the process proceeds to step S905.

In step S905, the control unit 101 controls the power supply unit 102 so as to output the communication power. Then, the process proceeds to step S906.

In step S906, the control unit 101 controls the first communication unit 106 so as to transmit the data requesting the power reception status data, similarly to step S801. Then, the process proceeds to step S907.

In step S907, the control unit 101 determines whether the power reception status data is received from the electronic apparatus 200 by the first communication unit 106 during a period since the issue of the request for the power reception status data to the electronic apparatus 200 until the preset time has elapsed, similarly to step S802. If the control unit 101 determines that the power reception status data is received from the electronic apparatus 200 by the first communication unit 106 (YES in step S907), the process proceeds to step S911. If the control unit 101 determines that the power reception status data is not received from the electronic apparatus 200 by the first communication unit 106 even after the preset time has elapsed since the issue of the request for the power reception status data (NO in step S907), the process proceeds to step S908.

If the power reception status data is not received from the electronic apparatus 200 by the first communication unit 106 (NO in step S907), there is a possibility that the electronic apparatus 200 may be removed from the predetermined range 300. Alternatively, if the power reception status data is not received from the electronic apparatus 200 by the first communication unit 106 (NO in step S907), there is a possibility that the first communication unit 206 of the electronic apparatus 200 may transition to a state incapable of performing the communication.

Therefore, in step S908, the control unit 101 causes the display unit 109 to display first warning data. The first warning data is, for example, data for notifying a user that the power supply apparatus 100 will stop the supply of the predetermined power to the electronic apparatus 200 because the first communication unit 106 and the first communication unit 206 become incommunicable with each other. Alternatively, the first warning data may be data for prompting the user to place the electronic apparatus 200 within the predetermined range 300 to allow the power supply apparatus 100 to resupply the predetermined power to the electronic apparatus 200. Alternatively, the first warning data may be data for prompting the user to operate the power supply apparatus 100 with use of the operation unit 110 to resupply the predetermined power to the electronic apparatus 200. Upon the display of the first warning data, the process proceeds to step S909.

In step S909, the control unit 101 controls the first communication unit 106 so as to transmit the power supply status data to the electronic apparatus 200. The control unit 101 generates the power supply status data including the data for identifying the power supply apparatus 100 and data indicating to stop the transmission of the predetermined power to the electronic apparatus 200. Further, the control unit 101 controls the first communication unit 106 so as to transmit the generated power supply status data to the electronic apparatus 200. Then, the process proceeds to step S910.

In step S910, the control unit 101 sets the power supply stop flag into the memory 108. Then, the process exits the flowchart illustrated in FIG. 9, and proceeds to step S607 illustrated in FIG. 6.

In step S911, the control unit 101 determines whether an error occurs in the electronic apparatus 200 with use of the power reception status data received by the first communication unit 106, similarly to step S807. If the control unit 101 determines that an error occurs in the electronic apparatus 200 (YES in step S911), the process proceeds to step S914. If the control unit 101 determines that no error occurs in the electronic apparatus 200 (NO in step S911), the process proceeds to step S912.

In step S912, the control unit 101 controls the first communication unit 106 so as to transmit data notifying the electronic apparatus 200 that the foreign object is detected. Then, the process proceeds to step S913.

If the control unit 101 determines that no error occurs in the electronic apparatus 200 (NO in step S911), there is a possibility that there may be the foreign object within the predetermined range 300.

Therefore, in step S913, the control unit 101 causes the display unit 109 to display second warning data. The second warning data is, for example, data for notifying the user that the power supply apparatus 100 will stop the supply of the predetermined power to the electronic apparatus 200 because there is the foreign object within the predetermined range 300. Alternatively, the second warning data may be data for prompting the user to remove the foreign object from the predetermined range 300 to allow the power supply apparatus 100 to resupply the predetermined power to the electronic apparatus 200. Alternatively, the second warning data may be data for prompting the user to operate the power supply apparatus 100 with use of the operation unit 110 to resupply the predetermined power to the electronic apparatus 200. Upon the display of the second warning data, the process proceeds to step S909.

In step S914, the control unit 101 determines the type of the error occurring in the electronic apparatus 200 with use of the power reception status data received by the first communication unit 106. Further, the control unit 101 determines whether the error occurring in the electronic apparatus 200 is a recoverable error. For example, if the error occurring in the electronic apparatus 200 is the first error, the control unit 101 determines that the error occurring in the electronic apparatus 200 is an unrecoverable error. On the other hand, if the error occurring in the electronic apparatus 200 is the second error, the control unit 101 determines that the error occurring in the electronic apparatus 200 is a recoverable error. Further, if the error occurring in the electronic apparatus 200 is the third error, the control unit 101 determines that the error occurring in the electronic apparatus 200 is an unrecoverable error. Further, if the error occurring in the electronic apparatus 200 is the fourth error, the control unit 101 determines that the error occurring in the electronic apparatus 200 is an unrecoverable error.

If the error occurring in the electronic apparatus 200 is an unrecoverable error (NO in step S914), the process proceeds to step S915. If the error occurring in the electronic apparatus 200 is a recoverable error (YES in step S914), the process proceeds to step S921.

If the error occurring in the electronic apparatus 200 is an unrecoverable error (NO in step S914), there is a possibility that an error unrecoverable by the power supply apparatus 100 may occur in the electronic apparatus 200.

Therefore, in step S915, the control unit 101 causes the display unit 109 to display third warning data. The third warning data is, for example, data for notifying the user that the power supply apparatus 100 will stop the supply of the predetermined power to the electronic apparatus 200 because the error occurs in the electronic apparatus 200. Alternatively, the third warning data may be data for prompting the user to check the error occurring in the electronic apparatus 200 to allow the power supply apparatus 100 to resupply the predetermined power to the electronic apparatus 200. Alternatively, the third warning data may be data for prompting the user to operate the power supply apparatus 100 with use of the operation unit 110 to resupply the predetermined power to the electronic apparatus 200.

If the occurrence of the third error in the electronic apparatus 200 is detected, in step S915, the control unit 101 may cause the display unit 109 to display the third warning data for prompting the user to mount the battery 211 onto the electronic apparatus 200. Upon the display of the third warning data, the process proceeds to step S909.

In step S916, the control unit 101 determines whether the time measured by the timer 101a is the detection time or longer. If the time measured by the timer 101a is the detection time or longer (YES in step S916), the control unit 101 stops the foreign object detection process. Then, the process proceeds to step S917. If the time measured by the timer 101a is not the detection time or longer (NO in step S916), the control unit 101 performs the foreign object detection process until the time measured by the timer 101a reaches or exceeds the detection time. Then, the process returns to step S902.

In step S917, the control unit 101 controls the power supply unit 102 so as to output the predetermined power. Further, the control unit 101 controls the timer 101a so as to measure a time elapsed since the start of the output of the predetermined power. Then, the process proceeds to step S918.

In step S918, the control unit 101 determines whether the time measured by the timer 101a is the predetermined time or longer. If the time measured by the timer 101a is the predetermined time or longer (YES in step S918), the process proceeds to step S919. If the time measured by the timer 101a is not the predetermined time or longer (NO in step S918), the process returns to step S918.

In step S919, the control unit 101 controls the power supply unit 102 so as to stop the output of the predetermined power. Then, the process proceeds to step S920.

In step S920, the control unit 101 controls the power supply unit 102 so as to output the communication power. Then, the process proceeds to step S921.

In step S921, the control unit 101 sets the power supply continuation flag into the memory 108. Then, the process exits the flowchart illustrated in FIG. 9, and proceeds to step S607 illustrated in FIG. 6.

(Power Reception Process)

Figure 10B:
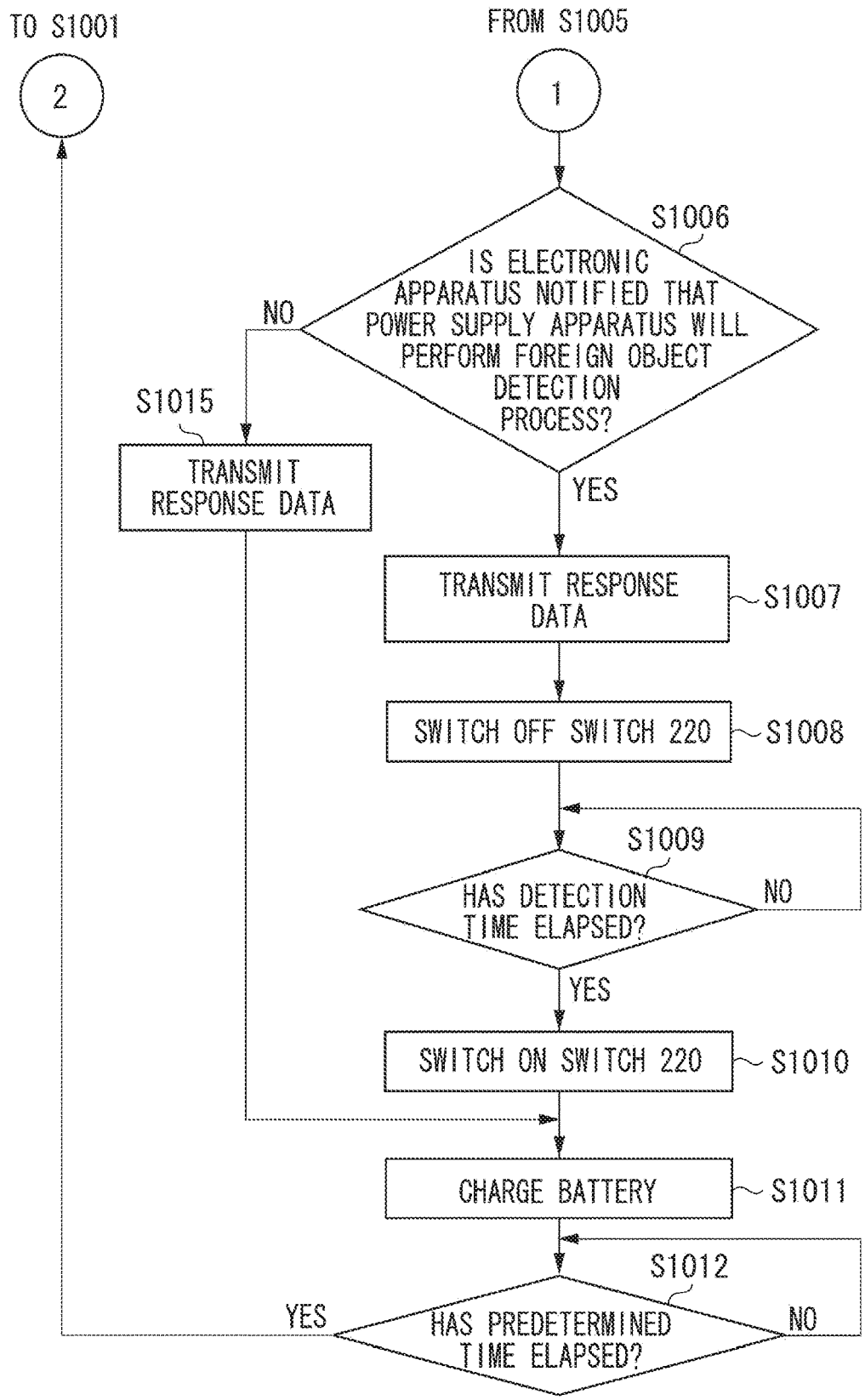
FIG. 10 (consisting of FIGS. 10A and 10B) is a flowchart illustrating an example of power reception a process performed by the electronic apparatus according to the first exemplary embodiment.

Next, a power reception process performed by the control unit 201 according to the first exemplary embodiment will be described with reference to a flowchart illustrated in FIG. 10 (consisting of FIGS. 10A and 10B). The control unit 201 executes the computer program stored in the memory 208, by which the power reception process can be realized. Assume that the switch 220 is switched on when the power reception process illustrated in FIG. 10 is performed.

In step S1001, the control unit 201 determines whether the data requesting the power reception status data is received by the first communication unit 206. If the data requesting the power reception status data is received by the first communication unit 206 (YES in step S1001), the process proceeds to step S1002. If the data requesting the power reception status data is not received by the first communication unit 206 (NO in step S1001), the process returns to step S1001.

In step S1002, the control unit 201 determines whether the charging of the battery 211 is completed according to the remaining capacity of the battery 211. If the charging of the battery 211 is completed (YES in step S1002), the process proceeds to step S1013. If the charging of the battery 211 is not completed (NO in step S1002), the process proceeds to step S1003.

In step S1003, the control unit 201 determines whether at least one of the first error, the second error, the third error, and the fourth error occurs in the electronic apparatus 200. If at least one of the first error, the second error, the third error, and the fourth error occurs in the electronic apparatus 200 (YES in step S1003), the process proceeds to step S1014. If neither of the first error, the second error, the third error, nor the fourth error occurs in the electronic apparatus 200 (NO in step S1003), the process proceeds to step S1004.

In step S1004, the control unit 201 controls the first communication unit 206 so as to transmit the power reception status data to the power supply apparatus 100. Then, the process proceeds to step S1005.

In step S1005, the control unit 201 determines whether the power supply status data is received from the power supply apparatus 100 by the first communication unit 206.

If the power supply status data is received by the first communication unit 206 (YES in step S1005), the process proceeds to step S1006. If the power supply status data is not received by the first communication unit 206 (NO in step S1005), the process ends.

In step S1006, the control unit 201 determines whether the power supply status data includes the information indicating to perform the foreign object detection process. If the power supply status data includes the information indicating to perform the foreign object detection process (YES in step S1006), the process proceeds to step S1007. If the power supply status data does not include the information indicating to perform the foreign object detection process (NO in step S1006), the process proceeds to step S1015.

In step S1007, the control unit 201 controls the first communication unit 206 so as to transmit the response data indicating that the power supply status data is received, to the power supply apparatus 100. Then, the process proceeds to step S1008.

In step S1008, the control unit 201 switches off the switch 220. Then, the process proceeds to step S1009. The control unit 201 controls the timer 201a so as to measure a time elapsed since the switch-off of the switch 220.

In step S1009, the control unit 201 determines whether the time measured by the timer 201a is the detection time included in the power supply status data, or longer. If the time measured by the timer 201a is the detection time or longer (YES in step S1009), the process proceeds to step S1010. If the time measured by the timer 201a is not the detection time or longer (NO in step S1009), the process returns to step S1009.

In step S1010, the control unit 201 switches on the switch 220. Then, the process proceeds to step S1011.

In step S1011, the control unit 201 controls the charging unit 210 so as to charge the battery 211 with use of the power received by the power reception antenna 203. Further, if the electronic apparatus 200 is powered on, the control unit 201 further supplies the power received by the power reception antenna 203 to the load unit 209. Then, the process proceeds to step S1012.

In step S1012, the control unit 201 determines whether the time measured by the timer 201a is the predetermined time included in the power supply status data, or longer. If the time measured by the timer 201a is the predetermined time or longer (YES in step S1012), the process proceeds to step S1001. If the time measured by the timer 201a is not the predetermined time or longer (NO in step S1012), the process returns to step S1012.

In step S1013, the control unit 201 controls the first communication unit 206 so as to transmit the power reception status data including information indicating that the charging of the battery 211 is completed, to the power supply apparatus 100. Then, the process ends.

In step S1014, the control unit 201 controls the first communication unit 206 so as to transmit the power reception status data including the information indicating that an error occurs in the electronic apparatus 200 and the type of the error to the power supply apparatus 100. Then, the process ends.

In step S1015, the control unit 201 controls the first communication unit 206 so as to transmit the response data indicating that the power supply status data is received, to the power supply apparatus 100. Then, the process proceeds to step S1011.

In this manner, the power supply apparatus 100 is configured to control whether to perform the process for detecting the foreign object according to the predetermined power that will be supplied to the electronic apparatus 200 and/or the predetermined time during which the predetermined power will be output. As a result, the power supply apparatus 100 carries out the foreign object detection in consideration of the influence of the wireless power supply on the foreign object, and therefore can realize the appropriate execution of the wireless power supply.

Further, the power supply apparatus 100 is configured to control whether to perform the process for detecting the foreign object according to the power requested from the electronic apparatus 200 and/or the remaining capacity of the battery 211 connected to the electronic apparatus 200. As a result, the power supply apparatus 100 carries out the foreign object detection in consideration of the state of the electronic apparatus 200, and therefore can realize the appropriate execution of the wireless power supply.

Further, the electronic apparatus 200 is configured to control the switch 220 according to the notification indicating whether to carry out the foreign object detection from the power supply apparatus 100. As a result, when the power supply apparatus 100 carries out the foreign object detection, the electronic apparatus 200 can allow the power supply apparatus 100 to highly accurately carry out the foreign object detection, and therefore can realize the appropriate execution of the wireless power supply.

Figure 8:
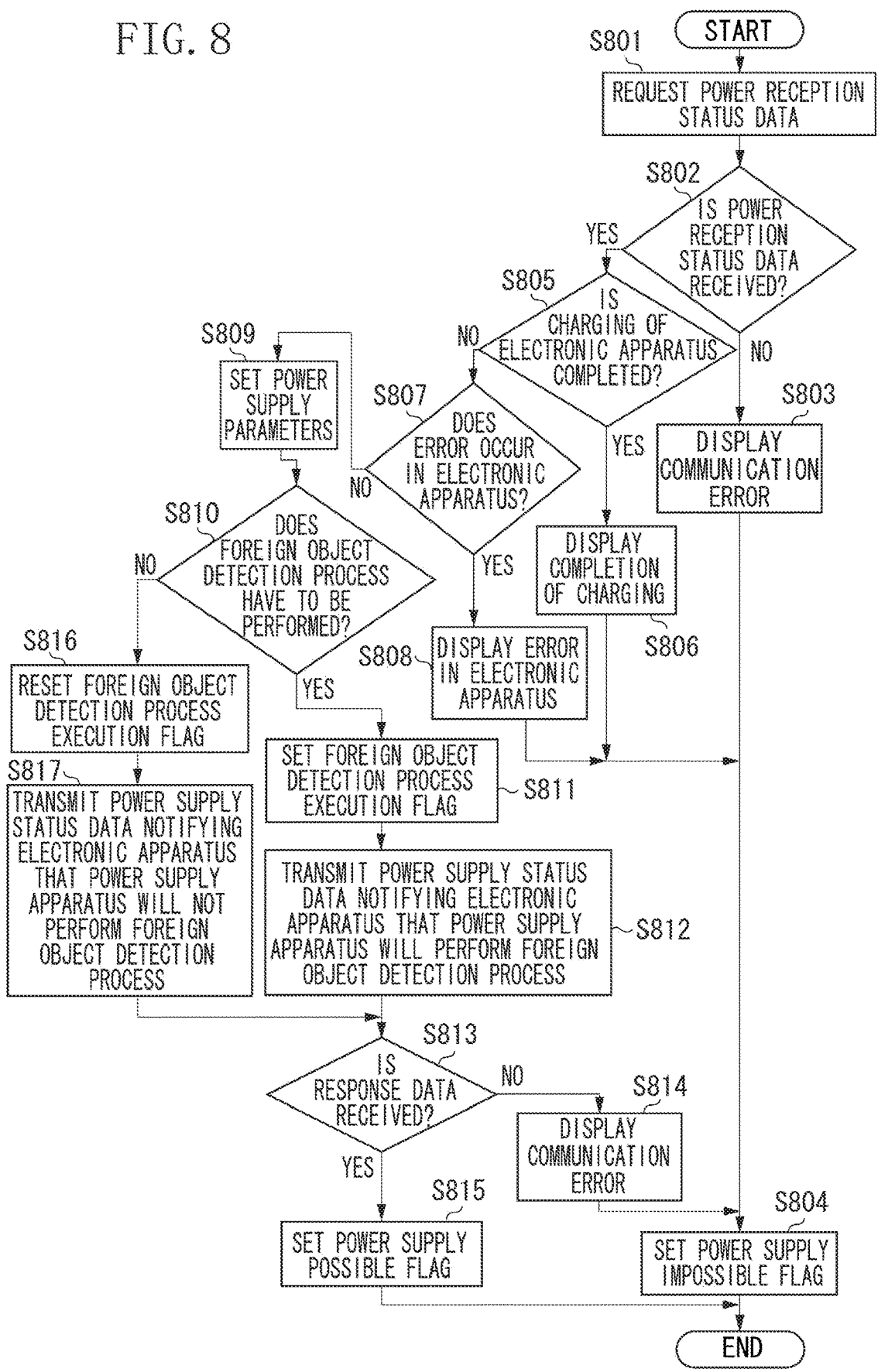
FIG. 8 is a flowchart illustrating an example of status data exchange process performed by the power supply apparatus according to the first exemplary embodiment.

The power supply apparatus 100 is configured to determine whether to perform the foreign object detection process every time the power supply apparatus 100 performs the process regarding the power supply that is illustrated in FIG. 8. However, the power supply apparatus 100 may be configured to determine whether to perform the foreign object detection process during the process regarding the power supply that is performed by the control unit 101 for the first time, and refrain from performing the foreign object detection process during the process regarding the power supply that is performed for the second time and after that. Alternatively, the power supply apparatus 100 may be configured to determine whether to perform the foreign object detection process during the process regarding the power supply that is performed by the control unit 101 for the first time, and control whether to perform the foreign object detection process according to a result of the determination made in the process regarding the power supply that is performed for the first time, during the process regarding the power supply that is performed for the second time and after that.

In the first exemplary embodiment, the power supply apparatus 100 is configured to supply the predetermined power to the electronic apparatus 200 with use of the power supply antenna 107, and perform the communication between the first communication unit 106 and the electronic apparatus 200 with use of the power supply antenna 107. However, the use of the antenna is not limited thereto. For example, the power supply apparatus 100 may be configured to separately include an antenna for supplying the predetermined power to the electronic apparatus 200, and an antenna for performing the communication between the first communication unit 106 and the electronic apparatus 200.

Further, the electronic apparatus 200 is configured to receive the power from the power supply apparatus 100 with use of the power reception antenna 203, and perform the communication between the power supply apparatus 100 and the first communication unit 206 with use of the power reception antenna 203. However, the use of the antenna is not limited thereto. For example, the electronic apparatus 200 may be configured to separately include an antenna for receiving the power from the power supply apparatus 100, and an antenna for performing the communication between the power supply apparatus 100 and the first communication unit 206.

The first exemplary embodiment has been described assuming that the first communication unit 106 operates as the reader/writer defined in the NFC standard, but the operation of the first communication unit 106 is not limited thereto. For example, the first communication unit 106 may operate as a Peer-to-Peer (P2P) device defined in the NFC standard.

The power supply apparatus according to the present invention is not limited to the power supply apparatus 100 described in the first exemplary embodiment. For example, the power supply apparatus according to the present invention can be also realized by a system including a plurality of apparatuses. Further, the electronic apparatus according to the present invention is not limited to the electronic apparatus 200 described in the first exemplary embodiment. For example, the electronic apparatus according to the present invention can be also realized by a system including a plurality of apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A power receiving apparatus comprising:
   a power reception interface configured to establish a connection between the power receiving apparatus and a power supply apparatus;

one or more processors being configured to perform control;

a communication unit configured to receive, from the power supply apparatus, information indicating whether a foreign object detection process for detecting a foreign object is to be performed by the power supply apparatus;

a power receiving unit configured to wirelessly receive power from the power supply apparatus; and a control unit configured to:

cause the communication unit to receive, from the power supply apparatus, the information indicating whether the power supply apparatus is to perform a foreign object detection process, after the connection between the power receiving apparatus and the power supply apparatus is established, and before the power receiving apparatus receives predetermined power from the power supply apparatus, and in a case where the communication unit receives information indicating that the foreign object detection process is to be performed by the power supply apparatus, the control unit causes the power receiving apparatus to perform a power reception disabling process whereby the power receiving apparatus disables the power reception interface and then enables the power reception interface, before the power receiving apparatus receives predetermined power from the power supply apparatus, wherein, in a case where information indicating that the foreign object detection process is not to be performed by the power supply apparatus is received, the control unit causes the power receiving apparatus to start receiving power from the power supply apparatus without performing the power reception disabling process, wherein, in a case where the control unit disables the power reception interface and subsequently information indicating that a foreign object is found is received from the power supply apparatus after the control unit disables the power reception interface, power to be supplied is restricted, and wherein, in a case where the control unit disables the power reception interface and subsequently information indicating that a foreign object is found is not received from the power supply apparatus after the control unit disables the power reception interface, power to be supplied is not restricted.

2. The power receiving apparatus according to claim 1, wherein, in a case where a predetermined time elapses from a time when the power reception interface is disabled, the control unit enables the power reception interface before the power receiving apparatus receives predetermined power from the power supply apparatus.

3. The power receiving apparatus according to claim 2, wherein the predetermined time is included in the information received from the power supply apparatus.

4. The power receiving apparatus according to claim 1, wherein after the control unit enables the power reception interface, the control unit starts receiving power.

5. The power receiving apparatus according to claim 4, further comprising:

a battery, wherein the battery is charged with the received power in a case where the control unit starts receiving power.

6. The power receiving apparatus according to claim 1, further comprising:

a battery, wherein the battery is charged with received power in a case where the control unit starts receiving power.

7. The power receiving apparatus according to claim 1, wherein the power reception interface is an antenna to be connected to a circuit including the communication unit, and wherein the control unit disables the power reception interface by disconnecting the antenna from the circuit.

8. The power receiving apparatus according to claim 7, wherein a switch is disposed between the antenna and the circuit, and wherein the control unit disconnects the antenna from the circuit by turning off the switch.

9. The power receiving apparatus according to claim 1, wherein in a case where an error occurs, the control unit transmits information indicating the error.

10. A method for controlling a power receiving apparatus having a power reception interface, the method comprising:

establishing, via the power reception interface, a connection between the power receiving apparatus and a power supply apparatus;

receiving, from the power supply apparatus, information indicating whether a foreign object detection process for detecting a foreign object is to be performed by the power supply apparatus;

receiving, wirelessly, power from the power supply apparatus;

receiving, from the power supply apparatus, the information indicating whether the power supply apparatus is to perform a foreign object detection process, after the connection between the power receiving apparatus and the power supply apparatus is established, and before the power receiving apparatus receives predetermined power from the power supply apparatus; and in a case where information indicating that the foreign object detection process is to be performed by the power supply apparatus is received, performing a power reception disabling process whereby the power reception interface is disabled and then enabled, before the power receiving apparatus receives predetermined power from the power supply apparatus, wherein, in a case where information indicating that the foreign object detection process is not to be performed by the power supply apparatus is received, starting to receive power from the power supply apparatus without performing the power reception disabling process, wherein, in a case where the control unit disables the power reception interface and subsequently information indicating that a foreign object is found is received from the power supply apparatus after the control unit disables the power reception interface, power to be supplied is restricted, and wherein, in a case where the control unit disables the power reception interface and subsequently information indicating that a foreign object is found is not received from the power supply apparatus after the control unit disables the power reception interface, power to be supplied is not restricted.

11. A non-transitory computer-readable storage medium which stores a program for causing a power receiving apparatus having an interface to execute a method, the method comprising:

establishing, via the power reception interface, a connection between the power receiving apparatus and a power supply apparatus;

receiving, from the power supply apparatus, information indicating whether a foreign object detection process for detecting a foreign object is to be performed by the power supply apparatus;

receiving, wirelessly, power from the power supply apparatus;

receiving, from the power supply apparatus, the information indicating whether the power supply apparatus is to perform a foreign object detection process, after the connection between the power receiving apparatus and the power supply apparatus is established, and before the power receiving apparatus receives predetermined power from the power supply apparatus; and in a case where information indicating that the foreign object detection process is to be performed by the power supply apparatus is received, performing a power reception disabling process whereby the power reception interface is disabled and then enabled, before the power receiving apparatus receives predetermined power from the power supply apparatus, wherein, in a case where information indicating that the foreign object detection process is not to be performed by the power supply apparatus is received, starting to receive power from the power supply apparatus without performing the power reception disabling process, wherein, in a case where the control unit disables the power reception interface and subsequently information indicating that a foreign object is found is received from the power supply apparatus after the control unit disables the power reception interface, power to be supplied is restricted, and wherein, in a case where the control unit disables the power reception interface and subsequently information indicating that a foreign object is found is not received from the power supply apparatus after the control unit disables the power reception interface, power to be supplied is not restricted.

* * * * *